(12) United States Patent
Keel et al.

(10) Patent No.: US 8,701,018 B1
(45) Date of Patent: Apr. 15, 2014

(54) METHODS AND APPARATUS FOR MANAGING INFORMATION OBJECTS IN AN ELECTRONIC PERSONAL INFORMATION MANAGEMENT SYSTEM

(76) Inventors: Paul Erich Keel, Cambridge, MA (US); Jeffrey Huang, Lausanne (CH)

( * ) Notice: Subject to any disclaimer, the term of this patent is extended or adjusted under 35 U.S.C. 154(b) by 467 days.

(21) Appl. No.: 12/793,207

(22) Filed: Jun. 3, 2010

Related U.S. Application Data

(63) Continuation-in-part of application No. 12/563,416, filed on Sep. 21, 2009, which is a continuation-in-part of application No. 11/118,301, filed on Apr. 29, 2005, now Pat. No. 7,640,511.

(60) Provisional application No. 60/566,723, filed on Apr. 29, 2004, provisional application No. 61/116,747, filed on Nov. 21, 2008, provisional application No. 61/262,827, filed on Nov. 19, 2009.

(51) Int. Cl.
  *G06F 3/00* (2006.01)
  *G06F 3/048* (2013.01)

(52) U.S. Cl.
  USPC ............ 715/751; 715/769; 715/777; 715/835

(58) Field of Classification Search
  USPC ......... 715/201, 212, 221, 227, 277, 751–759, 715/765, 769, 777, 835
  See application file for complete search history.

(56) References Cited

U.S. PATENT DOCUMENTS

| | | | | |
|---|---|---|---|---|
| 5,796,394 A | * | 8/1998 | Wicks et al. ................. | 715/751 |
| 6,240,421 B1 | * | 5/2001 | Stolarz ................. | 1/1 |
| 6,313,852 B1 | * | 11/2001 | Ishizaki et al. ............... | 715/751 |
| 6,948,135 B1 | * | 9/2005 | Ruthfield et al. ............. | 715/854 |
| 6,981,223 B2 | * | 12/2005 | Becker et al. ................. | 715/753 |
| 7,219,302 B1 | * | 5/2007 | O'Shaughnessy et al. ... | 715/752 |
| 7,234,117 B2 | * | 6/2007 | Zaner et al. .................. | 715/758 |
| 7,266,776 B2 | * | 9/2007 | Quillen et al. ............... | 715/758 |
| 7,343,365 B2 | * | 3/2008 | Farnham et al. ............. | 715/853 |
| 7,360,172 B2 | * | 4/2008 | Grossman et al. ............ | 715/839 |
| 7,734,690 B2 | * | 6/2010 | Moromisato et al. ......... | 709/204 |
| 7,930,629 B2 | * | 4/2011 | Hurst-Hiller et al. ......... | 715/234 |
| 2002/0188689 A1 | * | 12/2002 | Michael ....................... | 709/206 |
| 2003/0020749 A1 | * | 1/2003 | Abu-Hakima et al. ....... | 345/752 |
| 2003/0135565 A1 | * | 7/2003 | Estrada ........................ | 709/206 |
| 2004/0034688 A1 | * | 2/2004 | Dunn ........................... | 709/206 |
| 2005/0039134 A1 | * | 2/2005 | Wiggeshoff et al. ......... | 715/752 |
| 2005/0193345 A1 | * | 9/2005 | Klassen et al. ............... | 715/751 |

* cited by examiner

*Primary Examiner* — Omar Abdul-Ali
*Assistant Examiner* — Andrew Tank
(74) *Attorney, Agent, or Firm* — Chapin IP Law, LLC

(57) ABSTRACT

A system and technique provide management and display of information objects (IOs) in an electronic personal information management application. The system further provides a graphical user interface which allows every object to be used as a folder and the ability to subordinate any other type of object. A unique list view through which IOs can be displayed and managed is also disclosed.

21 Claims, 22 Drawing Sheets

METHODS AND APPARATUS FOR MANAGING INFORMATION OBJECTS IN AN ELECTRONIC PERSONAL INFORMATION MANAGEMENT SYSTEM

RELATED APPLICATIONS

This application is a continuation-in-part of earlier filed co-pending U.S. patent application Ser. No. 12/563,416 METHODS AND APPARATUS FOR MANAGING AND INFERRING RELATIONSHIPS FROM INFORMATION OBJECTS filed Sep. 21, 2009 which is a continuation in part of earlier filed U.S. patent application Ser. No. 11/118,301, now U.S. Pat. No. 7,640,511 and entitled "METHODS AND APPARATUS FOR MANAGING AND INFERRING RELATIONSHIPS FROM INFORMATION", filed Apr. 29, 2005 which application claims the benefit of the filing date of earlier filed U.S. Provisional Patent Application Ser. No. 60/566,723 entitled "METHODS AND APPARATUS FOR MANAGING AND INFERRING RELATIONSHIPS FROM INFORMATION," filed Apr. 29, 2004 and of earlier filed U.S. Provisional Patent Application Ser. No. 61/116,747 entitled "INFORMATION OBJECTS (IOS) AND INFORMATION VIEWS (IVS)," filed Nov. 21, 2008 that shares co-inventorship with the present application and earlier filed U.S. Provisional Patent Application Ser. No. 61/262,827 entitled "INFORMATION CONTAINERS," filed Nov. 19, 2009. This application is related to U.S. Provisional Patent Application entitled "Software System for Remote Collaborative Intelligence Analysis," Ser. No. 61/351,112 filed on the same date herewith. The entire teachings and contents of these Patent Applications are hereby incorporated by reference herein in their entireties.

STATEMENT REGARDING FEDERALLY SPONSORED RESEARCH

This invention was made with government support under government SBIR contract (N00014-08-C-0206). The Government may have certain rights in this invention.

BACKGROUND

Modern information processing systems allow users to collect and process large amounts of information. As an example, a typical computer system such as a personal computer (PC) includes an operating system that executes within the computer system to provide a graphical user interface to users of that computer system. A conventional graphical user interface typically includes a number of information objects such as graphical icons that represent information of relevance or importance to the user. The user accesses data and controls functionality of the computer system by selecting and operating such icons. By way of example, software applications such as word processors, graphical editing tools, electronic mail (e-mail) applications, web browsers and many others often provide graphical user interfaces that include a number of icons that have visual meaning to the user of the computer system. Typically, a software application renders icons to allow the user to invoke specific functionality or commands of that application and/or to allow the user to organize and access data. Many software applications use icons to represent messages, data or files that the user can access by selecting (e.g., clicking) the icon representing the data. As an example, if a user selects an icon that represents an e-mail message received by the computer, the computer will display that message. Other icons on a graphical user interface can represent folders or files maintained by the operating system within a file system containing notes, tasks, sent items, etc.

Many conventional electronic mail applications allow a user to select or collect various portions of information or content for display and future access. As an example, an electronic mail interface typically includes folders for storing messages, a separate calendar feature with reminders, a separate task list and a separate folder for notes. A conventional computer system e-mail application allows a user to store information referenced or created by other applications as a set of attached documents or files that can be retrieved by the user at a later time. Most conventional e-mail applications also provide a way for a user to arrange mail folders in order to organize documents and files in a manner that makes sense to the user. Computer operating systems and e-mail applications typically organize file systems in a hierarchical manner allowing the user to create folders with user-specified names. The user can store messages within the folders in a manner that makes sense to that user. An e-mail application is thus one of the most popular ways for users to organize and manage messages, tasks, calendars and other information of interest to those users.

Typical e-mail user interfaces do not allow users to organize and manage information of interest to that user with the ability to allow a user to spatially arrange information objects such as tasks displayed as graphical icons on a map in a way that makes intuitive sense to the user. In particular, such conventional applications do not always display information objects and associated metadata in ways that makes sense to that user. Users often would prefer more intuitive displays of this information.

Information availability and accessibility is continuously increasing. The problem is that information commonly exists in different formats, resides in different locations, is dynamically changing, and is used and modified by different people. This makes it difficult for users to effectively monitor, analyze and exchange information with a conventional e-mail application.

SUMMARY

Conventional mechanisms and techniques that allow a user to visually organize, collect and manage information objects that represent various portions of information suffer from a variety of deficiencies. In particular, conventional computer-based applications such as e-mail applications having a graphical user interfaces allow a user to organize and visualize numerous mail folders and messages that are of interest to the user and allow a user to represent folders graphically (e.g. via icons), but do little to manage other types of information object, form relationships that may exist between these information objects (IO)s and associate the IOs with stored portions of content or other metadata.

In particular, conventional e-mail interfaces such as those noted above allow a user to separately organize and arrange various portions of data or other information such as e-mail messages, tasks, notes and calendar items in a graphical user interface in a manner that makes sense to the user, but such systems do not promote conversations and collaboration among users. Another deficiency with conventional e-mail interfaces is that information is represented in different formats and, depending on the format, is stored in different locations. For example, e-mail interfaces store e-mails messages in folders or mailboxes, files are stored in computer directories, and notes may be stored in files, and so forth. The proposed personal information management (PIM) interfaces disclosed herein solve this deficiency by introducing in one embodiment a standardized view of information objects as folders. These folders represent information objects and associated metadata abstractly thus allowing users to focus on and compare the information content and context rather than be distracted by the information format and location.

As an example of problems with conventional e-mail interfaces, a user using conventional e-mail interfaces may spend large amounts of time collecting portions of content such as email messages with various attachments including graphics, text, news stories, web pages, or other such information for collaborative production of a large content-based research project. Many users may be involved in this process. As each user collects portions of information using conventional information management systems, the users store and organize their respective portions of information within an a file system and communicate this information via an e-mail application. Each user may view e-mail messages and attachments on his or her desktop or other work areas that represent folders of collected messages. As the number of participants grows, it becomes difficult for the user to recognize the number and names other participants, the number of associated documents and file, and whether the documents have been updated or even viewed.

Each user might group icons for related pieces of information together in a list, within close proximity to each other, or in file directories. In conventional systems however, it is up to the user to identify what other portions of information might be of interest to the user that the user has not already identified and collected. As an example, if the collaborative production being developed by the users is a project related to current events, each user may collect articles and stories related to that current event. Using conventional systems, it is up to each user to research and discover stories or other content related to that current event that might be available from a variety of different information sources. While conventional collaboration systems might provide a common repository for such collected information contributed by each user, there is little or no ordering to this information, other than an order specified by the users who place the content into the shared repository such as a file system or database. Each user must frequently communicate with other users in a highly manual manner (e.g. via a telephone call, e-mail or other mechanism) to identify content that other users may have discovered and collected that might be of relevance to the production under development.

Such conventional personal information management (PIM) systems do not automatically and dynamically analyze relations between user placed icons that represent the various pieces of available information in order to assist users in identifying other portions of content that many of interest to those users. More specifically, conventional e-mail applications do not analyze and display specific spatial relations, collaborative context relations, chronological context relations, and the like between information sources associated with icons arranged by a user to determine other portions of information, such as other portions of content collected by other users, that may be of relevance or interest to the user. As a result, conventional email applications limit a user's knowledge of other available content and information to which that user may have interest.

As an example, using a conventional e-mail application, a user can quickly become overwhelmed with a large number of messages that are irrelevant to the information they are seeking. Thus a conventional e-mail application is not aware of certain metadata that is associated with an information object. Also in these conventional e-mail applications, a user is not able to flexibly copy, move, share information objects and organize them chronologically and geographically. In contrast, embodiments of the invention are based in part on the observations that conventional e-mail interfaces provide a significant cognitive burden on users caused by limited displays and separate displays of messages, tasks, notes and calendar item. Furthermore, the ability to collaborate remotely and asynchronously, as well as the necessity to dynamically adapt to changing circumstances is not provided by conventional e-mail applications. Conventional e-mail applications do not provide an automated ability to organize, identify and display information sources that come in many different formats. For example, information may be received in the form of a phone call, an instant message, an SMS message a computer file, a web site, a database item, a verbal comment, a radio transmission, a newspaper, a television spot, a magazine, or a security camera.

Embodiments of the invention incorporate advanced graphical user interfaces and function to address the shortcomings in conventional systems. In one particular technique to manage IOs a plurality of IOs including at least one email are provided and the IOs are represented as folders. The IOs are displayed in an electronic mail list view as one of a plurality of IO types of folder. The graphical interface allows selecting a particular IO, associating the IO folder type of the selected IO with IO metadata, displays an indication of the IO metadata in an electronic mail list view and the user shares the selected IO with at least one participant. Such a technique advantageously allows a user to manage and display IOs of interest in an intuitive manner and provides a centralized view of the IOs, associated data and participants sharing the IOs. By allowing any IO to be a folder and folders to include any type of IO, a user can organize numerous IOs into a single folder view. Additionally, every object can be any type, can be a folder and can be shared. In another aspect of the invention, sharing the selected IO includes dragging a participant icon onto the selected IO folder icon or dragging the selected IO folder icon onto a participant icon, receiving the IO as a copied IO and synchronizing the copied IO. In yet another aspect of the invention, sharing the IO among a plurality of participants includes sharing the IO by providing an e-mail system communications path between at least two of the participants as a result of an interaction with an electronic mail list view by one of the participants.

In other embodiments the GUI indicates that a shared IO includes metadata which has been modified. In yet another embodiment, user defined tags are associated with IOs by associating the selected the IO with at least one tag and the user can create a tag list and hirarchically structure the tag list by moving tags between tag folders. In in another embodiment, dates and times associated with a selected IO are displayed by displaying one of: a time wise order, a numeric time countdown and a visual countdown.

A display user interface disclosed herein includes a first portion including one or more selectable tabs to select a container including a collection of information objects, a second portion including a list of IOs in a selected container arranged in a matrix with indications for each information object of: a participant associated with the IO; a relative time associated with the IO; a count of the documents associated with the IO; one or more user selectable tags; a count of the participants associated with the IO; and a third portion. The third portion includes at least one of a calendar, a participant list, a list of files, a tag list including names for the user selectable tags. The third portion further includes a map view reflecting geographical locations corresponding to locations associated with a selected IO.

Other embodiments provide an indication that an IO can be shared by at least one participant, of the number of participants sharing an IO the names of the participants, whether all invited participants have accepted an invitation to share the IO, whether there is an update to the IO. For date and time metadata, another embodiment provides a display of a time wise order, a numeric time countdown and a visual countdown, of an IO selected by a user. Other features of the user interface include indicating a chronological order arranged by location for a selected group of IO by displaying a calculated route among container items, and indicating, on a row including an IO, an indication that at least one copy exists in multiple locations.

Another technique coalesces information objects (IO)s from different sources for display in a user interface by displaying views of IOs associated with icons representing user assigned folder types, displaying IO metadata associated with selected ones of the IOs; and providing a user interface controls to move, copy; subordinate the folders representing the IOs. In other embodiments, the technique also includes providing a combined view of an information object and metadata in an electronic mail application. The combined view can include a plurality of task IOs and location metadata and the user interface chronologically organizes the information in a location-time display.

Embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include various graphical representations of the IOs themselves, for example as displayed on a graphical user interface as will be explained in more detail.

It is to be understood that the system of the invention can be embodied strictly as a software program, as software and hardware, or as hardware alone such as within a processor, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Embodiments disclosed herein provide techniques for coalescing information objects (IO)s from different sources for display in a user interface by displaying views of IOs associated with icons representing user assigned folder types, displaying IO metadata associated with selected ones of the IOs, and providing a user interface controls to move, copy; subordinate the folders representing the IOs and share IOs.

There are many ways to allow a user to associate objects with other related objects. One approach incorporated in some of the embodiments described below is to allow every object to be used as a folder. Furthermore in certain embodiment, the visual display is limited to a top level used for "Big Issues" and a single sub-level used for "Little Issues." This is accomplished by dragging a first object onto a second object. As a result, the first object becomes subordinate to the second object. In summary, every object can be any type, can be a folder and can be shared.

As used herein, the terms "container" and "folder" are generally used to indicate a repository for IOs, which in some embodiments are visualized as a list. Further, containers generally refer to upper level folders used for visualization and organizational purposes. Unlike objects which can serve as lower level folders and can be associated with metadata, containers usually do not include meta-data. The terms "object," "container item," "information object" and "IO" are used interchangeably, and can refer to any type of information, may act as a folder for other IOs, may be shared, and may contain metadata.

In the description below it is assumed that objects have the following properties: Objects can represent different types of information; objects can be shared among multiple participants; Objects can include other objects and objects can be moved into and out of other objects; objects can be associated with different types of information; objects can simultaneously exist in multiple locations (including multiple locations on a single PC; and objects can reference alias of other objects and can include metadata.

Figure 1:
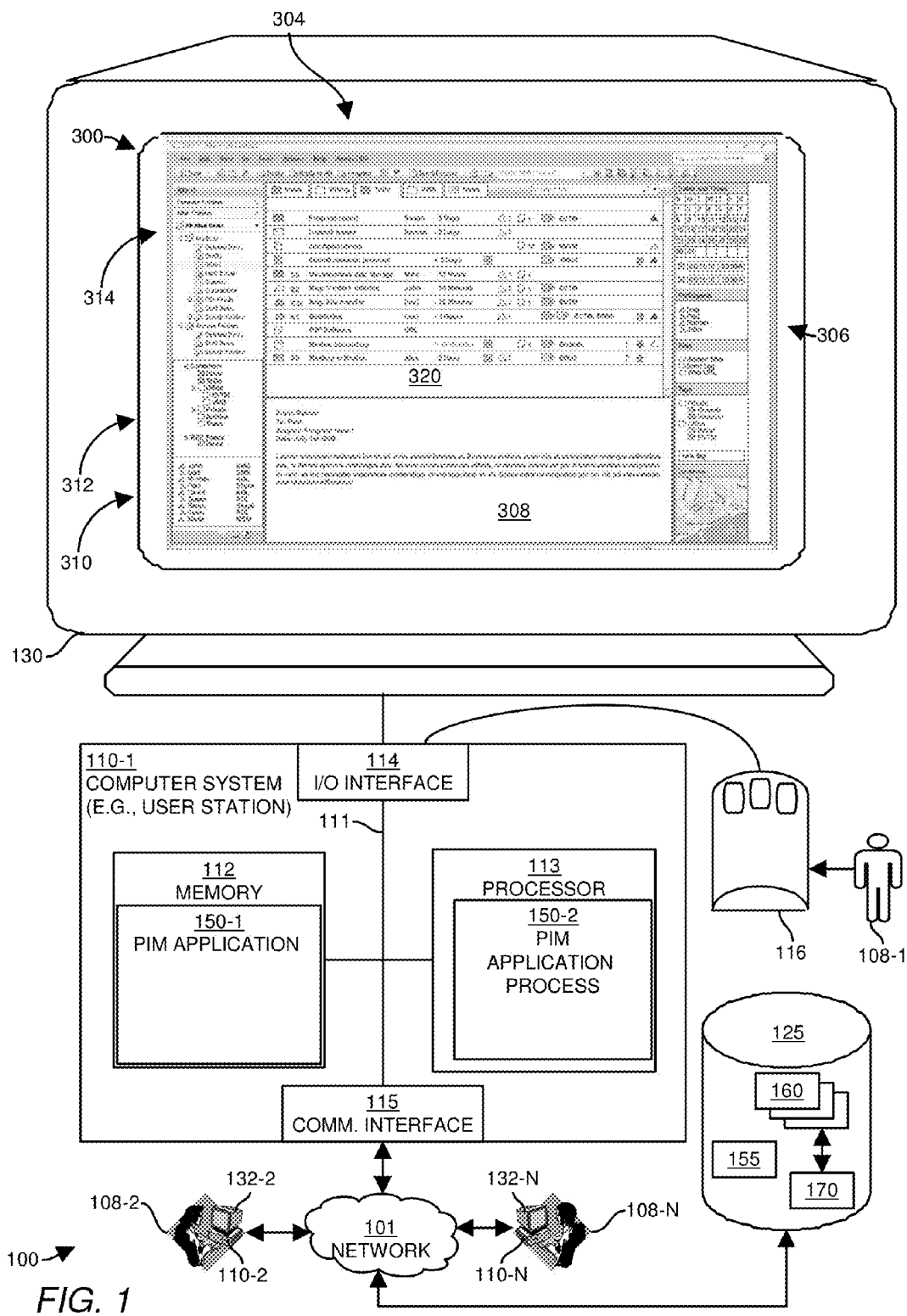
FIG. 1 is an example computer system configured with an electronic mail application and graphical user interface in accordance with one example embodiment disclosed herein.

Now referring to FIG. 1, a computer-networking environment 100 suitable for use in explaining example embodiments of invention is illustrated. The computer-networking environment 100 includes a network 101 such as a local area network (e.g., LAN) that interconnects a plurality of computer systems 110-1 through 110-N that each execute respective personal information management (PIM) applications 150 (application 150-1 and process 150-2 under respective control of a plurality of users 108. The computer systems 110 may be any type of computerized device such as a personal computer, laptop, workstation, mainframe terminal, or the like. In this example, each computer system 110 generally includes in interconnection mechanism 111 such as a data bus, motherboard or other circuitry that interconnects a memory 112, a processor 113, an input output interface 114 and a communications interface 115. A display 130 such as a computer monitor and input output mechanism 116 couple to the computer system 110 via the input output interface 114. The communications interface 115 allows communication with other computer systems 110-2 through 110-N over the network 101. In one embodiment, the communications path is provided by an e-mail system. The architecture of the computer system 110-1 is shown in FIG. 1 by way of example only. It is to be understood that the details of the example computer systems 110-2 through 110-N can be similar to those of computer system 110-1 but are not shown in FIG. 1 due to drawing space limitations.

The memory 112 within each computer system 110 may be any type of computer readable medium such as random access memory (RAM), read only memory (ROM). The memory 112 may be fixed or removable from the computer system 110, such as a floppy disk, magnetic disk, optical disk media (e.g., CD ROM) or the like. In one embodiment, the memory 112 is encoded with computer program logic (e.g., software code) that includes a relation manager application 120-1. When the processor 113 executes the electronic mail application 150-1, the processor 113 produces a PIM process 150-2 that executes as explained herein to produce a graphical user interface 300 (the example being produced by the PIM application 150 in computer 110-1) on the display 130 for viewing by the user 108. When referring to the PIM application 150, it can thus be a reference to the executing process 150-2, the application code 150-1, or both. Each PIM application 150 produces a graphical user interface 300 that provides, to the user 108, visual knowledge representation, dynamically updated content and hosted conversation. To do so, the PIM application 150, includes a workspace server 155, an exchange server 153 and a database server 154 that each IOs within the graphical user interface 300. The PIM applications 150 adds discovered relations to IOs in a database 125 (the database 125 may already include relations that other people or software products added).

Information Objects (IOs) are flexible data structures and can include data files that can include other data files as well as metadata for the display of IO contents. Using system 110, a user 108 can interact with an information object, the system 110 facilitates sharing the IO among a plurality of participants; provides controls for attaching multi-media data and metadata to the IO, displays the IO in the context of an PIM application; and in response to interaction with other participants, provide a communications path between at least two of the participants to share the IOs.

Figure 2:
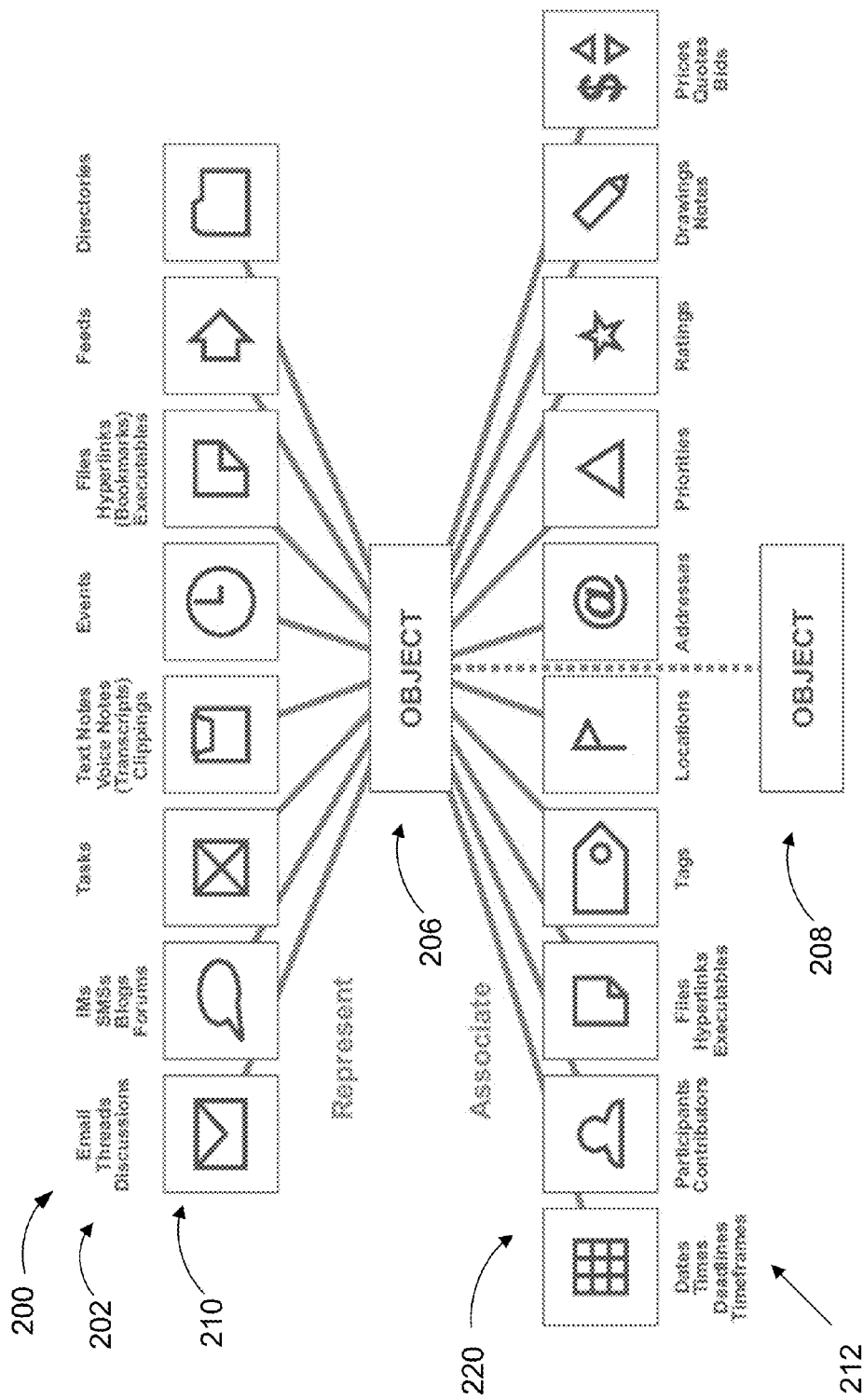
FIG. 2 shows exemplary IOs with corresponding icon representations and associated metadata disclosed herein.

Directing attention to FIG. 2, exemplary IOs 202 (also referred to as IOs or objects 202) are represented in the graphical user interface 300 (FIG. 1) by corresponding icons 210. Diagram 200 illustrates object representation and association. Object types include but are not limited to: an email; a thread; a discussion; an instant message (IM); a task; a short message (SMS); a blog; a forum; a text note; an event; a voice note (transcripts) a clipping; a file; an RSS feed; a directory; a hyperlink; a bookmark; a rating annotation; an executable program. Icons are generally associated with the IO type to indicate a primary source of data. In one exemplary application, it was found that limiting the number of IOs 206 and corresponding icons 210 to about between five and ten types (with additional sub types) was most efficient for the users of the PIM application 150.

Objects 202 can represent and be associated with different types of information. Exemplary metadata 212 includes but is not limited to: a date; a time; a deadline; a timeframe; a participant; a contributor; a file; a hyperlink; an executable; a tag; a location; multi-media data; an address; a priority; a rating; a drawing; a note; a price; a quote; and a bid which can be represented by icons 220. Objects can include or reference other objects. Here, for example, object 206 is associated with object 208. Objects can simultaneously exist in multiple locations and can be shared with multiple people.

Returning attention back to the graphical user interface 300 in FIG. 1, the PIM graphical user interface (GUI) 300 presents users with several panels (or portions) of the display. In one configuration, the graphical user interface 300 can include some elements similar to corresponding elements in the interface of the Outlook® application provided by Microsoft Corporation of Redmond Wash., USA (Outlook is a registered trademark of Microsoft Corporation). The GUI 300 is designed to support individual and collaborative sense-making tasks such as information analysis, planning, decision-making, brainstorming, and problem-solving. The GUI 300 functionality provides users 108 with the means to efficiently view, create, collect, organize, analyze, and discuss information.

Figure 3A:
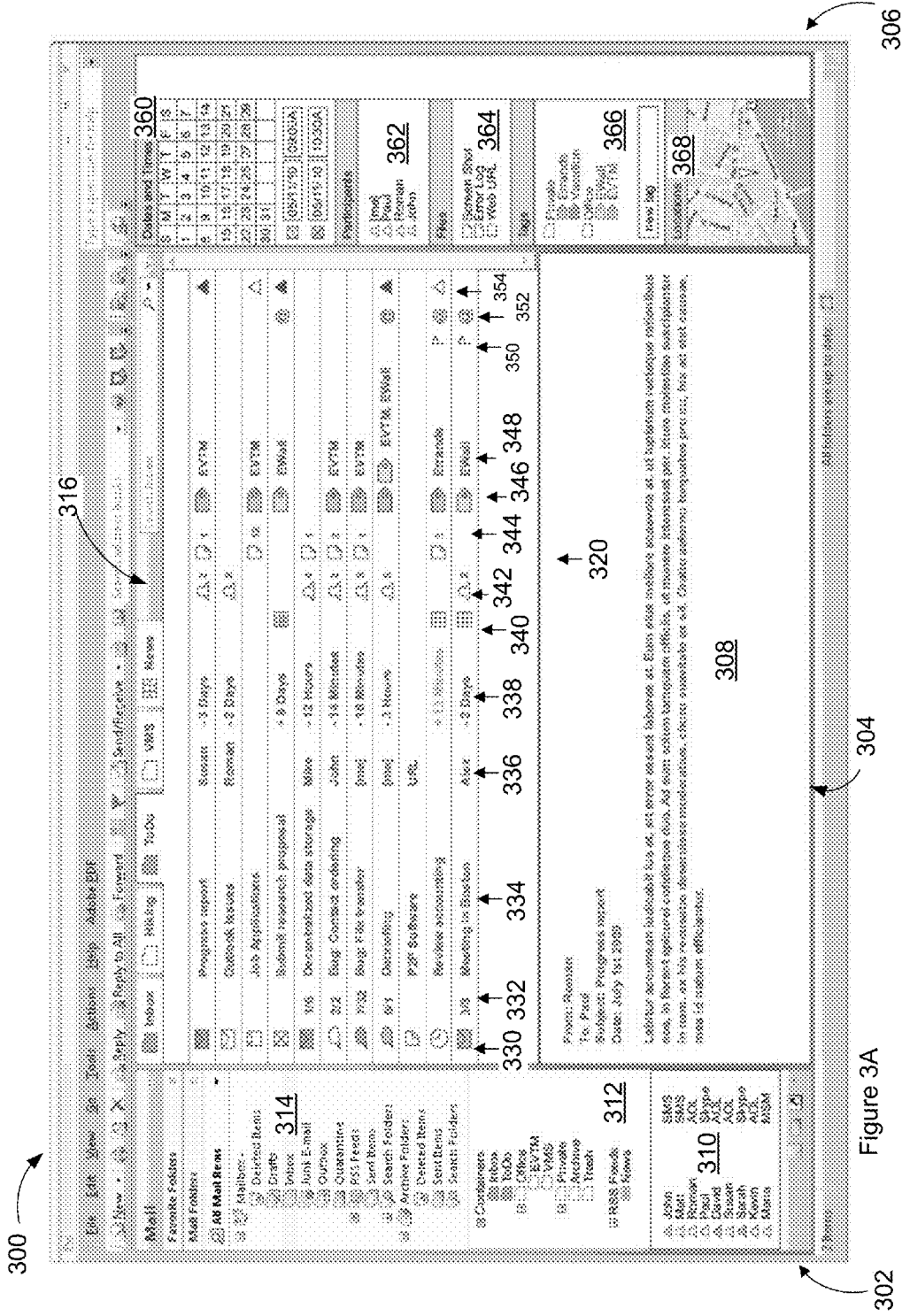
FIG. 3A is a diagram of an exemplary graphical user interface (GUI) operating within an electronic email application in accordance with one example embodiment disclosed herein.

FIG. 3A is a diagram of the exemplary graphical user interface (GUI) 300 for the management of IOs in accordance with one example embodiment disclosed herein. In one embodiment including a modified version of Microsoft Outlook, the GUI 300 organization includes three panels 302, 304 and 306 in addition to a tool bar and a status row. Each panel 302, 304 and 306 includes one or more sub-panels. Here panel 302 includes a participant sub-panel 310, a container sub-panel 312 and a mail item sub-panel 314 (also referred to as Inbox folder 314 and similar to an Outlook Inbox) which is similar to conventional mail item sub-panels. Panel 304 includes a sub-panel 308 and a sub-panel 320. The sub-panels are described in more detail below. The display of the panels and sub-panels facilitates the organization of different types of IOs while retaining a single list of all items in a selected container.

In one embodiment, the basic interface looks and acts like a conventional email handler. However, the improved GUI 300 provides, for example, an Inbox folder 314 that displays both emails and chat invitations. The GUI 300 advantageously displays and provides user interaction for e-mails, note, tasks and chats in a similar manner.

In this embodiment, here a sub-panel 320 lists all of the IOs for a selected tab 316 indicating a user defined container holding a collection of IOs. The sub-panel 320 includes one list 334 for all types of IOs (including e-mail items associated with folders). The IOs can move up and down in the list 334 and each IO can be shared. The following operations are possible using interface 300: dragging participant icons onto objects; dragging objects onto participant icons; dragging tasks to container; dragging participant icons onto objects; dragging and dropping objects onto participant icons; selecting objects and modifying metadata; opening and closing folders/objects that contain other objects; dragging and dropping different types of information into the container (creates objects); dragging and dropping different types of information or objects into sub-panel 364; and dragging and dropping objects onto other containers in tab 316 or sub-panel 312.

In sub-panel 320 of the middle panel 304, the IOs for a selected container are listed in rows with an icon in column 330 representing the type of IO. Column 332 indicates the number of read and unread messages (e.g. emails threads or instant messages). The list 334 includes the user assigned names for the listed IOs. Column 336 indicates at least one additional participant (owner) if the IO is shared. The symbol "[me]" indicates that the viewer is the owner of the IO.

Column 340 indicates whether there is date/time/deadline/timeframe metadata associated with the corresponding IO. Column 342 indicates whether the corresponding IO is shared and a count of the number of participants involved in a conversation if shared. Column 344 indicates whether there are any associated files/hyperlinks/executables for the corresponding IO is shared and a count of the number of files exchanged. Column 346 indicates whether there are one or more user defined tags for the corresponding IO. Column 348 lists a user assigned tag name. Column 350 indicates whether there is location metadata associated with the corresponding IO. Column 352 indicates whether there is address metadata associated with the corresponding IO. Column 354 indicates whether there is a priority associated with the corresponding IO.

Panel 306 includes various sub-panels which display metadata related to the currently selected container tab. Here, sub-panel 360 displays time and date information for the selected IO. Sub-panel 362 displays participants for the selected IO when the IO is shared. Sub-panel 364 displays associated file/hyperlinks/executables for the selected IO. Sub-panel 366 displays associated tags for the selected IO and has a control to allow the user to create new user defined tags. Sub-panel 368 displays geographical information (generally in a map format) for the selected IO. The sub-panels which are displayed are a function of the selected object (i.e., the displayed indicia is a function of the IO type and associated metadata).

Figure 3B:
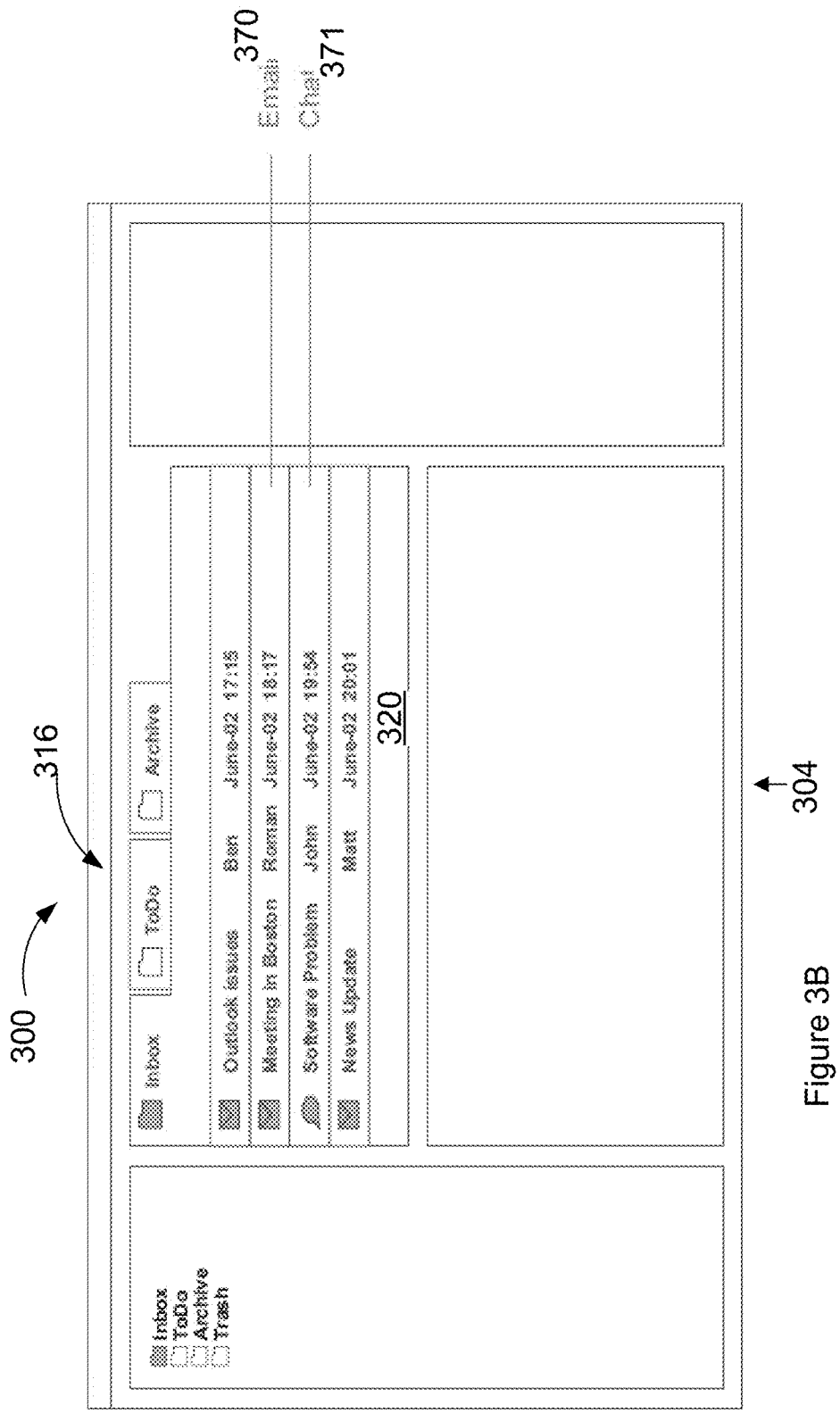
FIG. 3B is a more detailed diagram of the exemplary GUI Organization of FIG. 3A depicting the operation of adding emails and instant messages (chats) to a folder.

FIG. 3B is a diagram of the exemplary graphical user interface (GUI) 300 for the management of IOs in accordance with one example embodiment disclosed herein. Here panel 304 sub-panel 320 includes four IOs in the "Inbox" container or folder. In addition to an e-mail message 370, the Inbox container includes an IO representing a chat 371. The interface 300 allows a user to monitor many discussions and as described in related application, the chat icon allows a user to communicate through the selected IO chat 371.

Figure 3C:
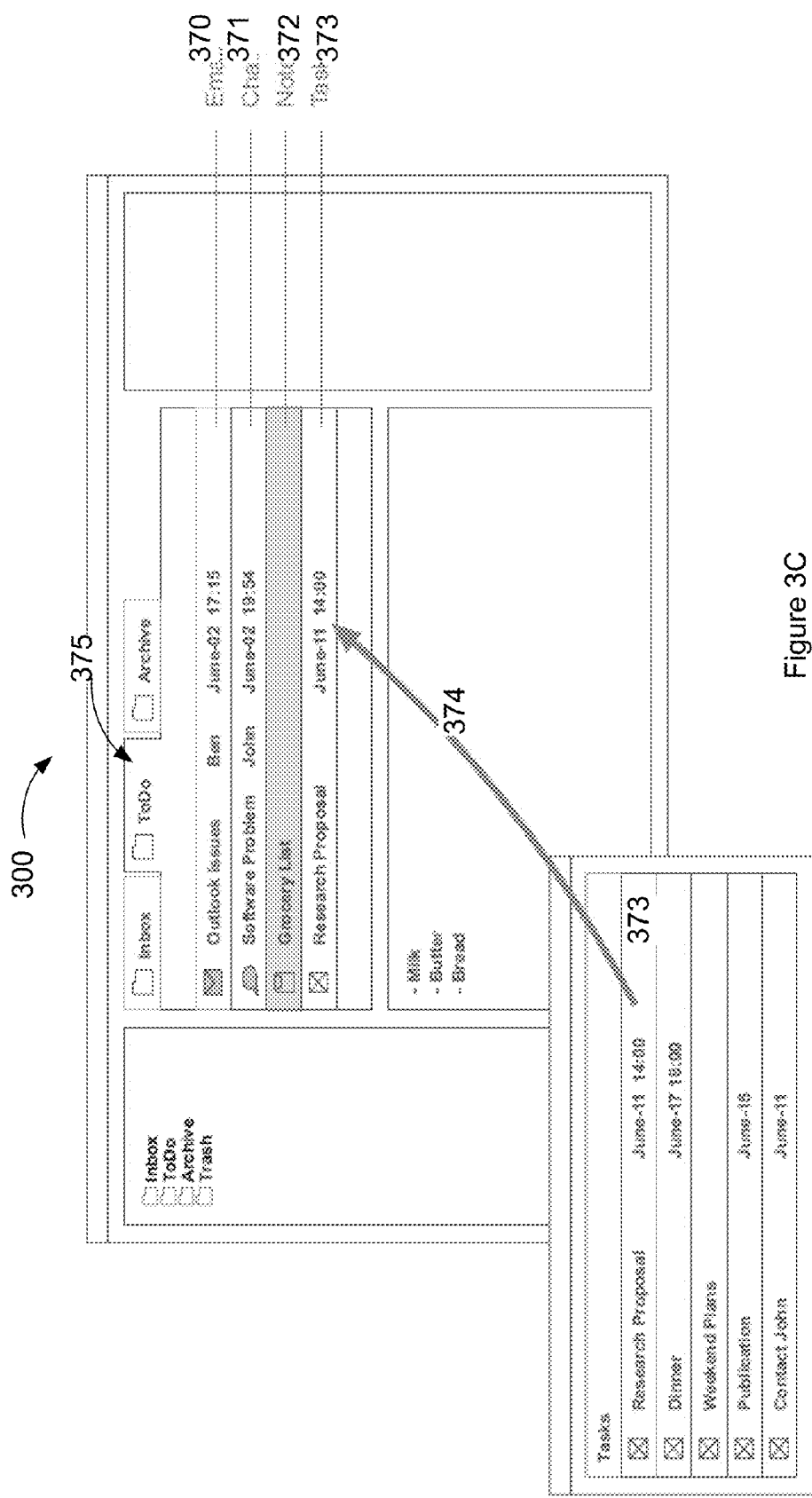
FIG. 3C is a more detailed diagram of the exemplary GUI Organization of FIG. 3A depicting the operation of adding notes and task to a folder.
Figure 3D:
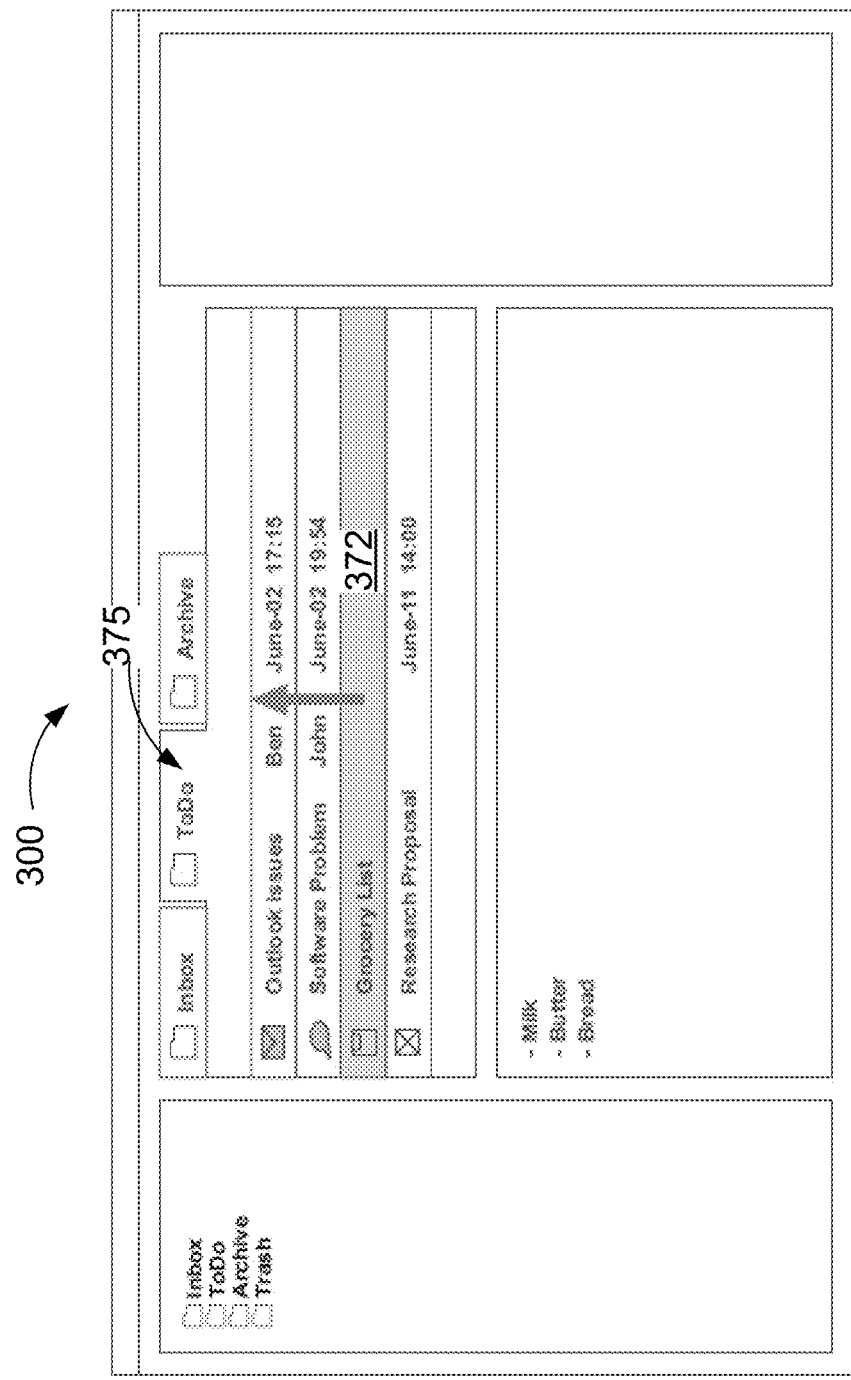
FIG. 3D is a more detailed diagram of the exemplary GUI Organization of FIG. 3A depicting the operation of prioritizing container items.
Figure 3E:
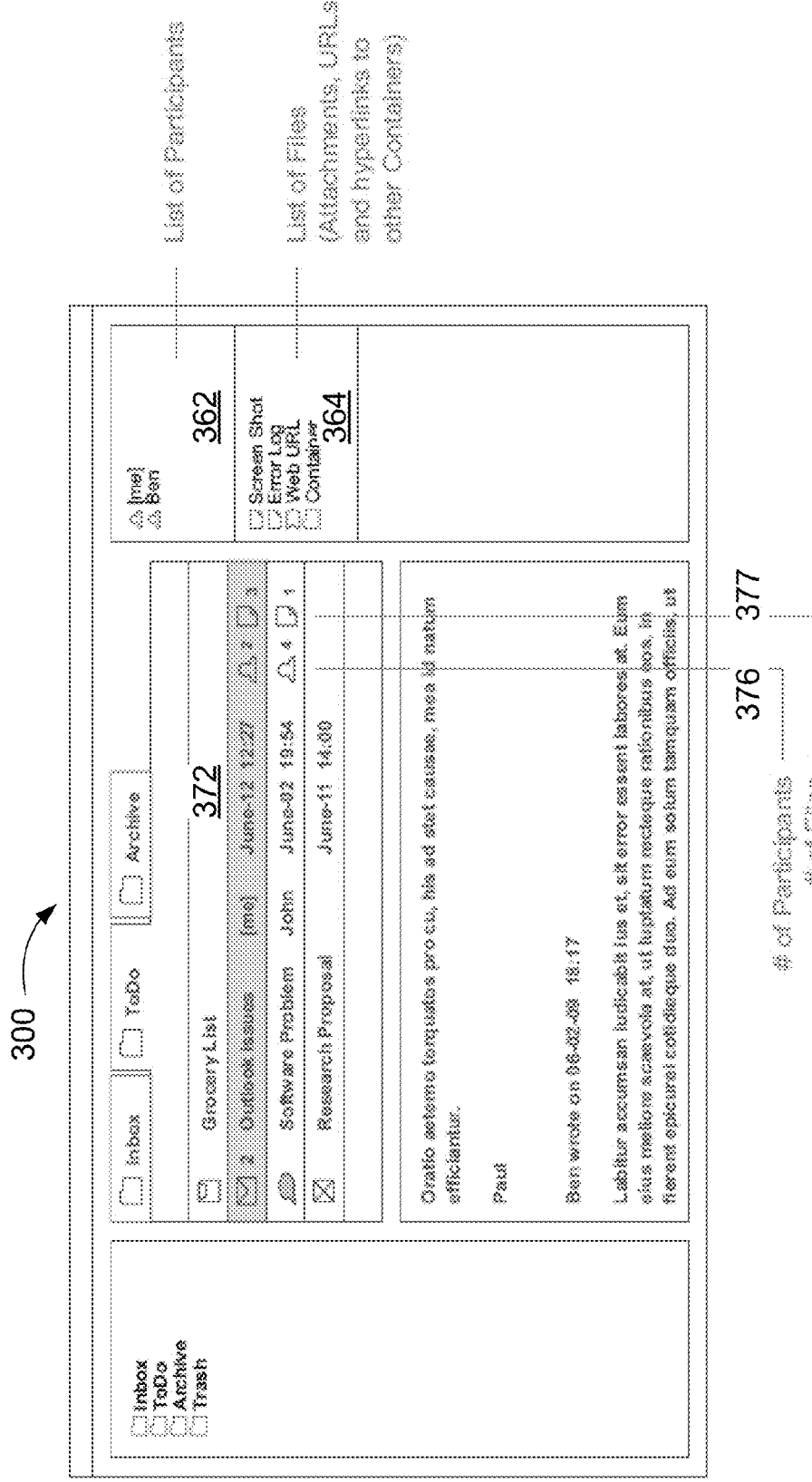
FIG. 3E is a more detailed diagram of the exemplary GUI Organization of FIG. 3A depicting the operation of viewing participants and files.

FIG. 3C is a diagram of the exemplary GUI 300 and demonstrates how the GUI 300 facilitates the movement (indicated by arrow 374) of a task IO "Research Proposal" 373 from a task folder to a container "To Do" 375. FIG. 3D is a diagram of the exemplary GUI 300 and demonstrates how the GUI 300 facilitates the movement (indicated by arrow) of an IO "Grocery List" 372 to the top of the container "To Do" 375. FIG. 3E is a diagram of the exemplary GUI 300 and shows the result of the movement of the IO "Grocery List" 372 to the top of the container "To Do" 375. Here, the IO "Grocery List" 372 is now at the top of the container "To Do" 375. With such an operation, the user can prioritize container items by moving the container items up and down the list. The GUI 300 facilitates adding notes and tasks. It is also possible to copy existing notes and tasks from 3rd party applications to an IO in a container or to create new notes and tasks directly in a container.

FIG. 3E also shows how the GUI 300 indicates using an icon and number 376 whether an IO is shared including the number of participants sharing an IO. The GUI 300 also can indicate whether any files are associated with the IO and a count of the number of files exchanged. The GUI 300 allows the user to view participants and files. The side bar sub-panel 362 displays all participants and files associated with the currently selected container item. The user can double-click the name of a person to open the corresponding address book entry. In a similar fashion, the user can double-click a file to open attachments, a URL or a referenced container.

Figure 3F:
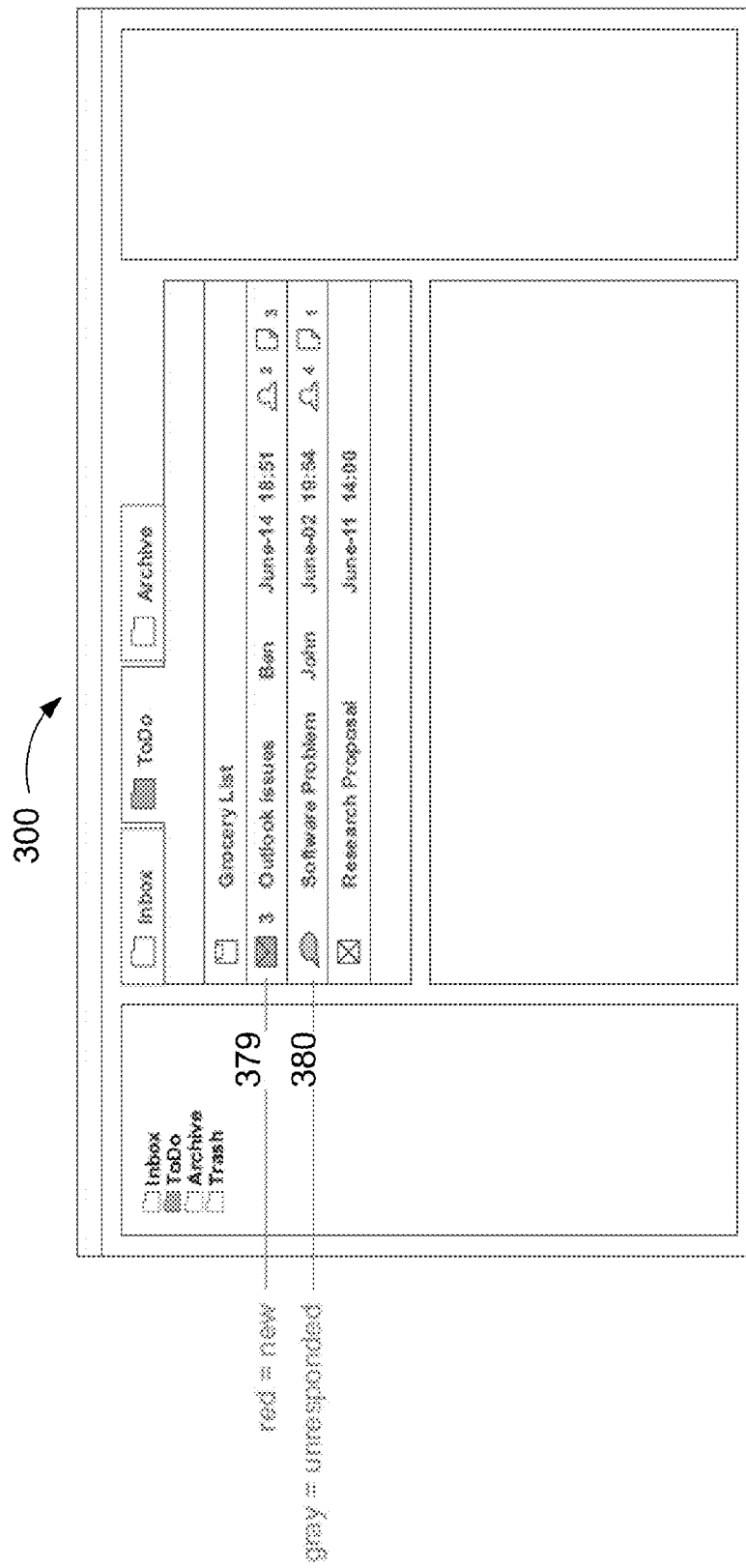
FIG. 3F is a more detailed diagram of the exemplary GUI Organization of FIG. 3A depicting the operation of monitoring email threads and chats.

FIG. 3F is a diagram of the exemplary GUI 300 and demonstrates how the GUI 300 indicates the status of an IO. Here, color is used to indicate that an IO has a new mail or instant message (IM) message by displaying a red colored mail icon 379. A gray colored chat icon 380 indicates an unresponded chat request. The user can move chats to the Archive, Trash or Ignore Container in a similar operation used to handle e-mail messages.

Figure 3G:
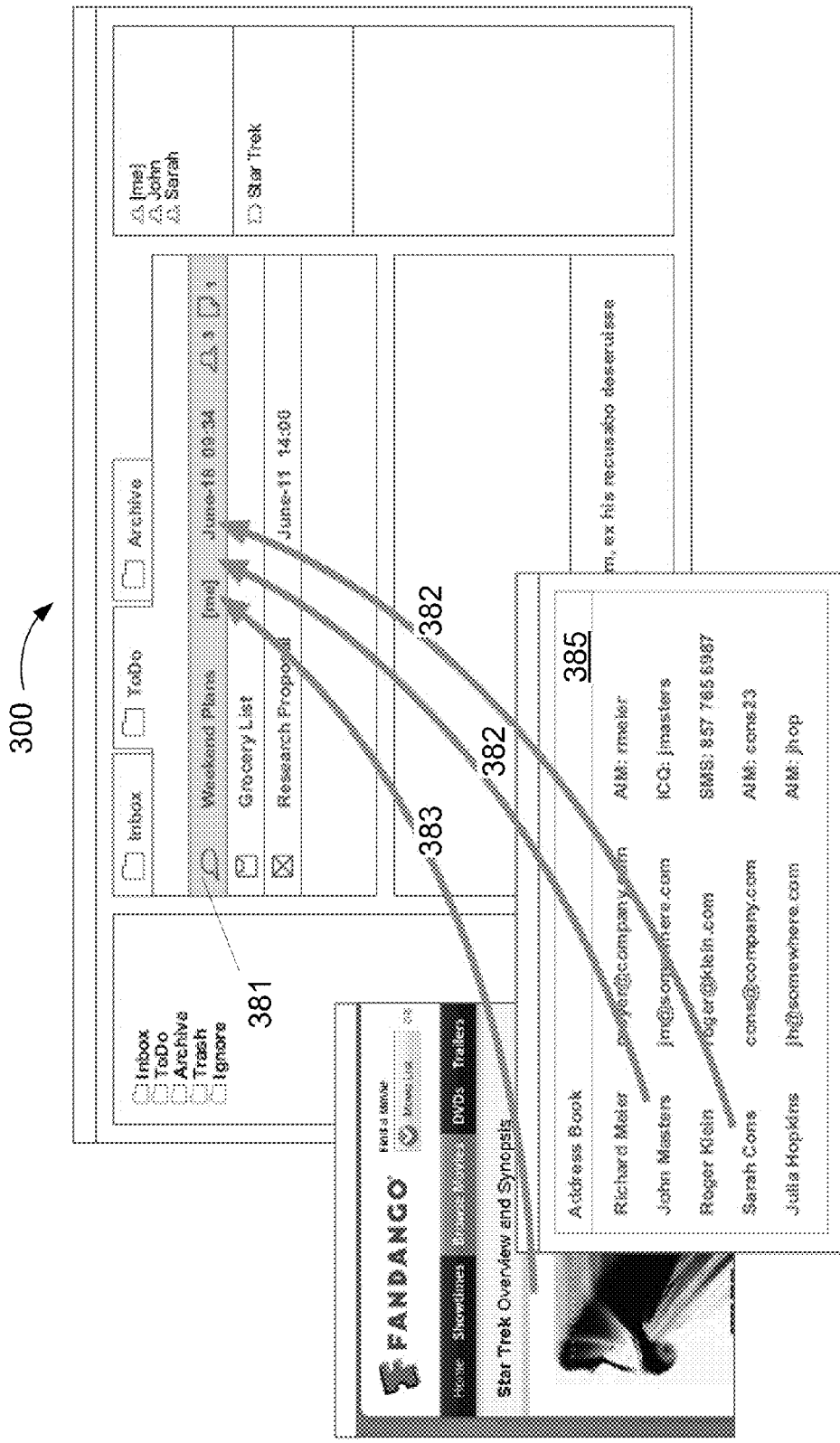
FIG. 3G is a more detailed diagram of the exemplary GUI Organization of FIG. 3A depicting the operation of initiating a chat and sharing files and URLs.

FIG. 3G shows how participants can be associated with an IO "Weekend Plans" 381 by dragging and dropping indicated by arrow 382 the names of the participants from an address book to the highlighted row "Weekend Plans," 381 on the IO on panel 320. A hyperlink can also be associated with the IO with a drag and drop operation indicated by arrow 383. When a user initiates a chat, a new IO container item is created, the user then provides a subject heading, adds participants, and optionally adds files. Participants are automatically invited into the conversation, for example by receiving a copy of the IO, and the invited participants gain access to the optionally added files and other IO functionality. Subsequently, the user can "Talk through object" by clicking the chat icon of the IO to reestablish the chat. Here, for example, a chat is started by dragging participants from an address book 385 onto the object "Weekend Plans" 381 and than dragging indicated by arrow 383 a website URL 386 to the object "Weekend Plans" 381. The GUI display then indicates that there are three participants involved and one associated URL has been attached to the chat.

Figure 3H:
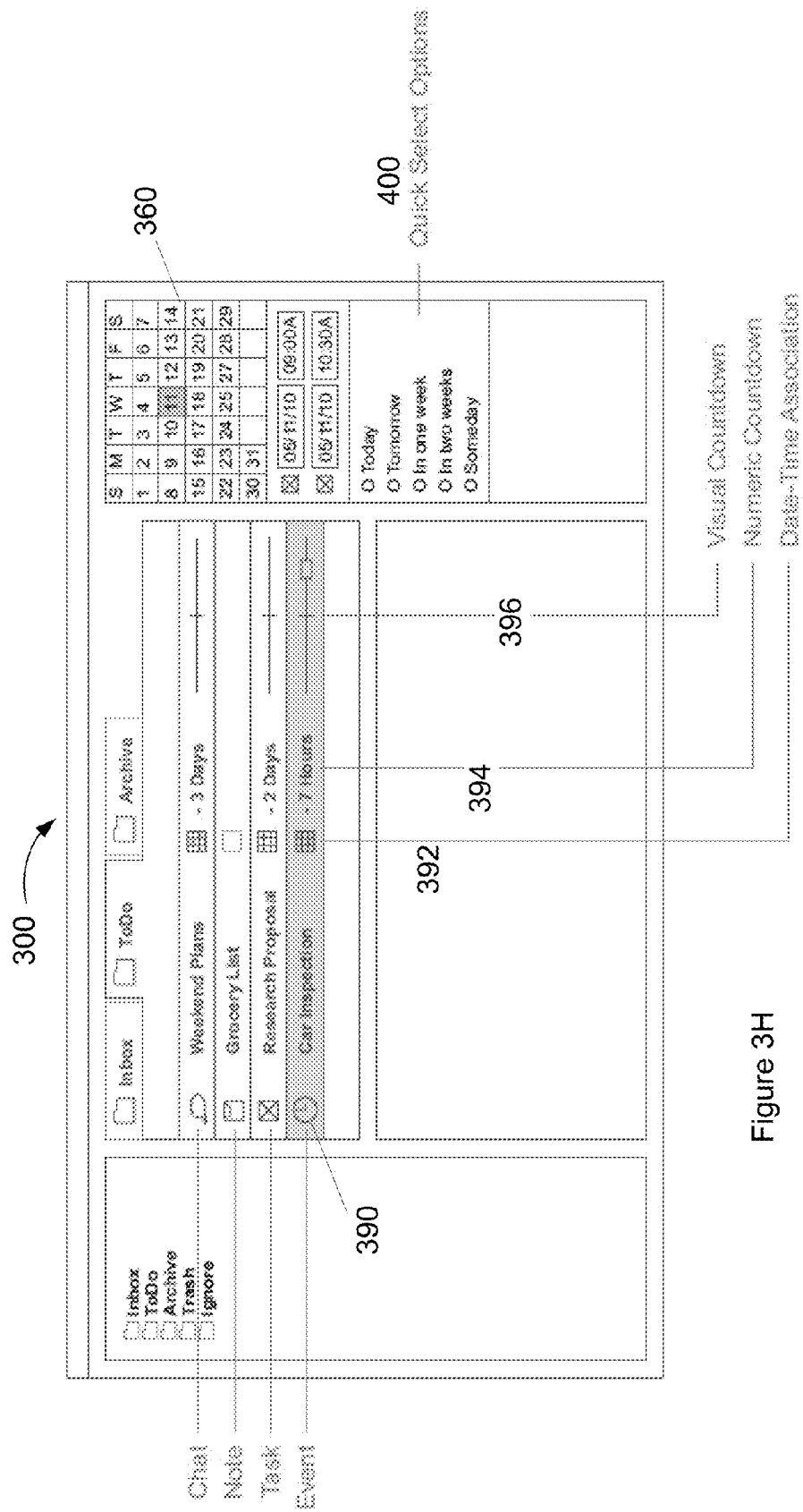
FIG. 3H is a more detailed diagram of the exemplary GUI Organization of FIG. 3A depicting the operation of managing dates and times.

FIG. 3H shows further details of how the GUI 300 is used to manage dates and times. In one embodiment, IO container items associated with dates and times are flagged with a date-time association icon 392 (identifying a calendar object) and automatically displayed in one or more of a numeric countdown 394 (or alternatively a count-up for past events) and a visual countdown 396 where the vertical bar is "now" (i.e., the current time and date). The associated date and time information is also displayed in the time and date sub-panel 360 for the selected IO. Calendar entries can be moved from the calendar to the Container, dates and times can be modified. Items can be dragged and drooped, for example, from an Outlook calendar view. The time and date information from an IO can be optionally displayed in/exported to a 3rd party calendar application.

Figure 3J:
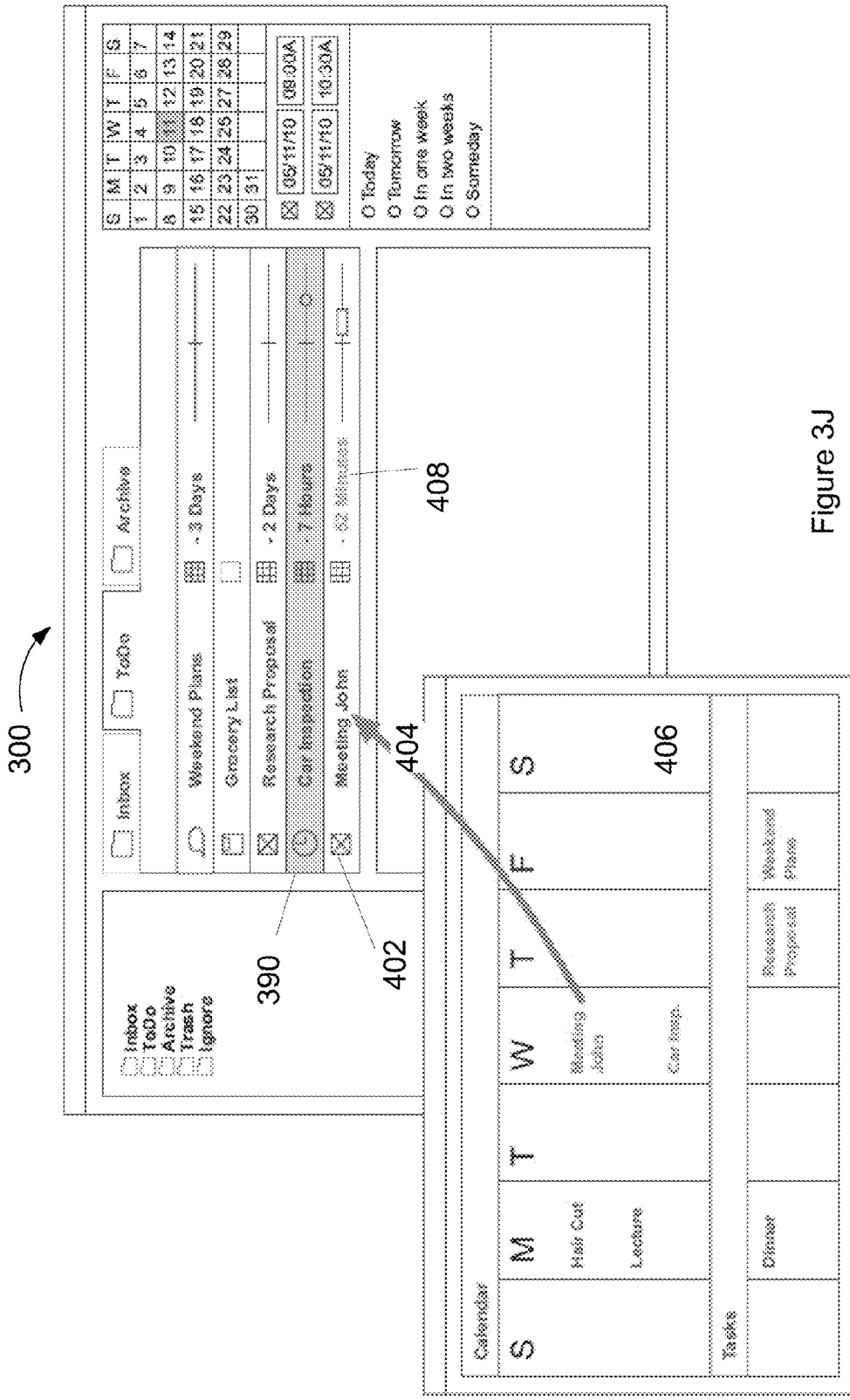
FIG. 3J is a more detailed diagram of the exemplary GUI Organization of FIG. 3A depicting the operation of managing dates and times.
Figure 3K:
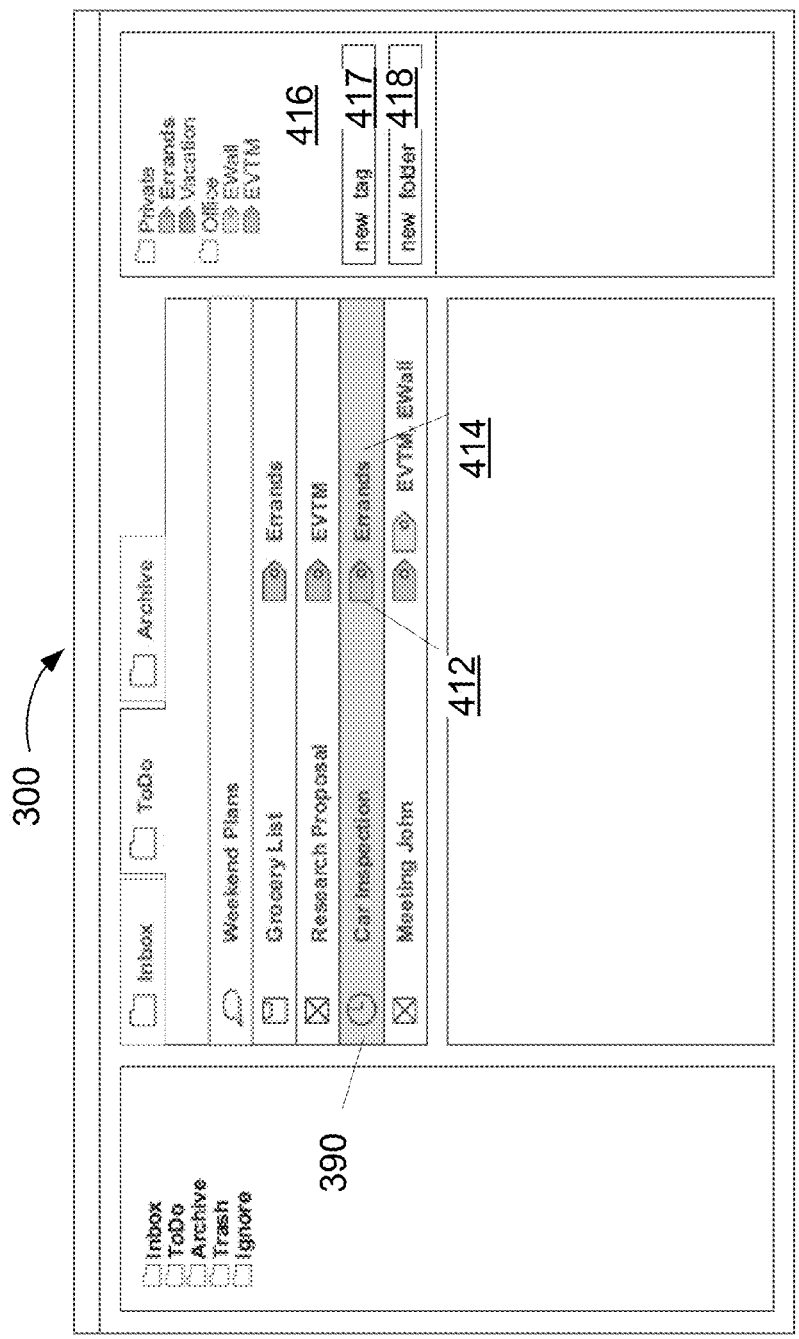
FIG. 3K is a more detailed diagram of the exemplary GUI Organization of FIG. 3A depicting the operation of categorizing container items.

FIG. 3J shows further details of how the GUI 300 used to manage dates and times. The GUI 300 opens a calendar view 406, which can be used, for example, to negotiate dates and times for meetings and chat sessions. Here, dragging (indicated by arrow 404) the "Meeting John" from the calendar view 406 creates the IO task 402. Since the meeting is within one hour, the numeric countdown 408 is displayed in a different color. FIG. 3J shows a calendar view for the car inspection event IO 390 while FIG. 3K shows tagged items in a view of the same event IO "Car Inspection" 390. The user 108 switches between views (alternatively windows or containers) by selecting the tab in sub-panel 304 or by selecting a view from the list of views in sub-panel 312 on the left side of the GUI 300. In the tag view, the user can categorize container items. The user associates tags by selecting a Container Item and one or more tags from the side bar sub-panel 416 in text boxes 417 and 418 to add new tags to selected folders. The user can also hierarchically structure the tag list by moving tags between folders. A tag can indicate that an object is associated with a geographical location or other metadata.

Figure 3L:
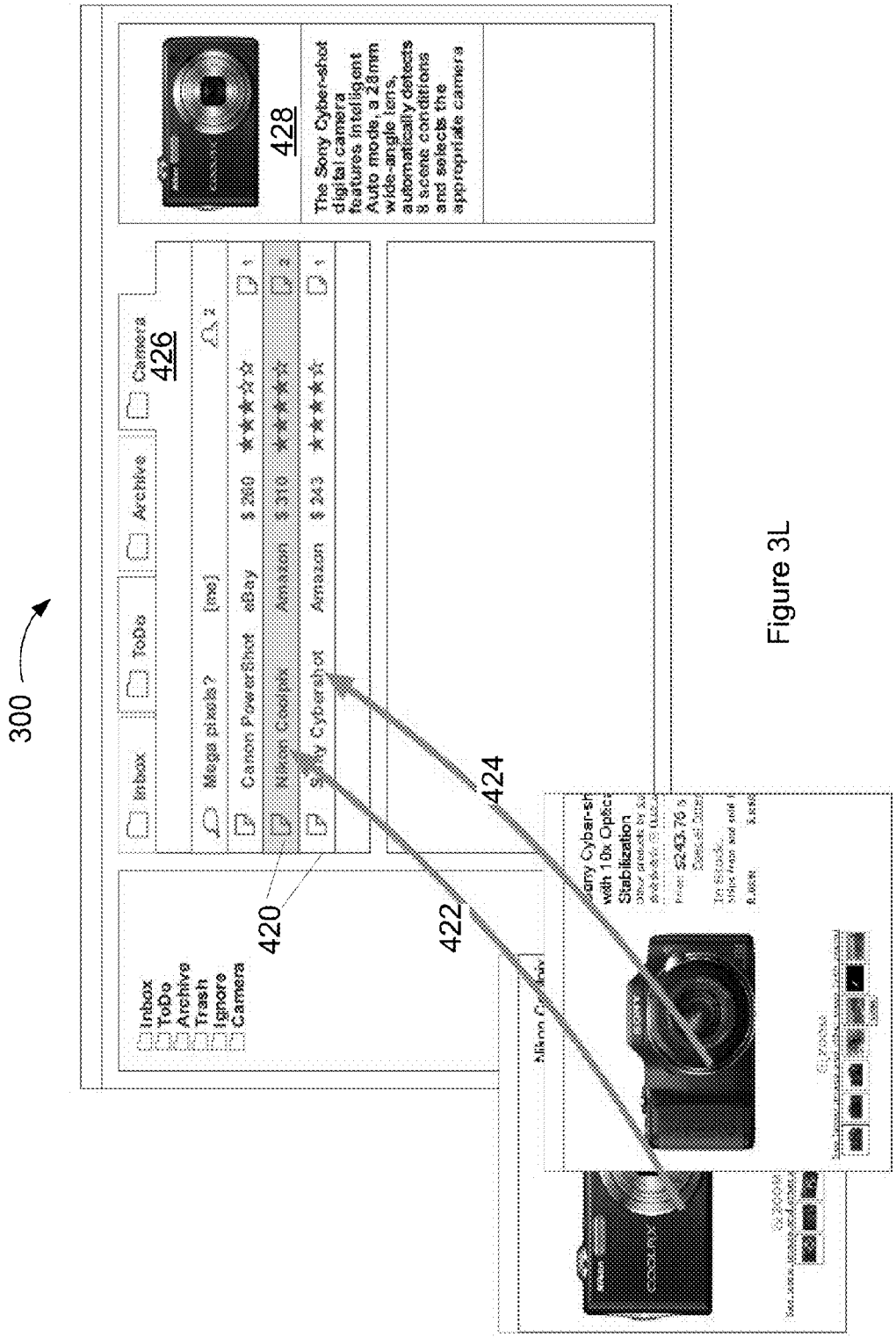
FIG. 3L is a more detailed diagram of the exemplary GUI Organization of FIG. 3A depicting the operation of managing files and URLs.
Figure 3M:
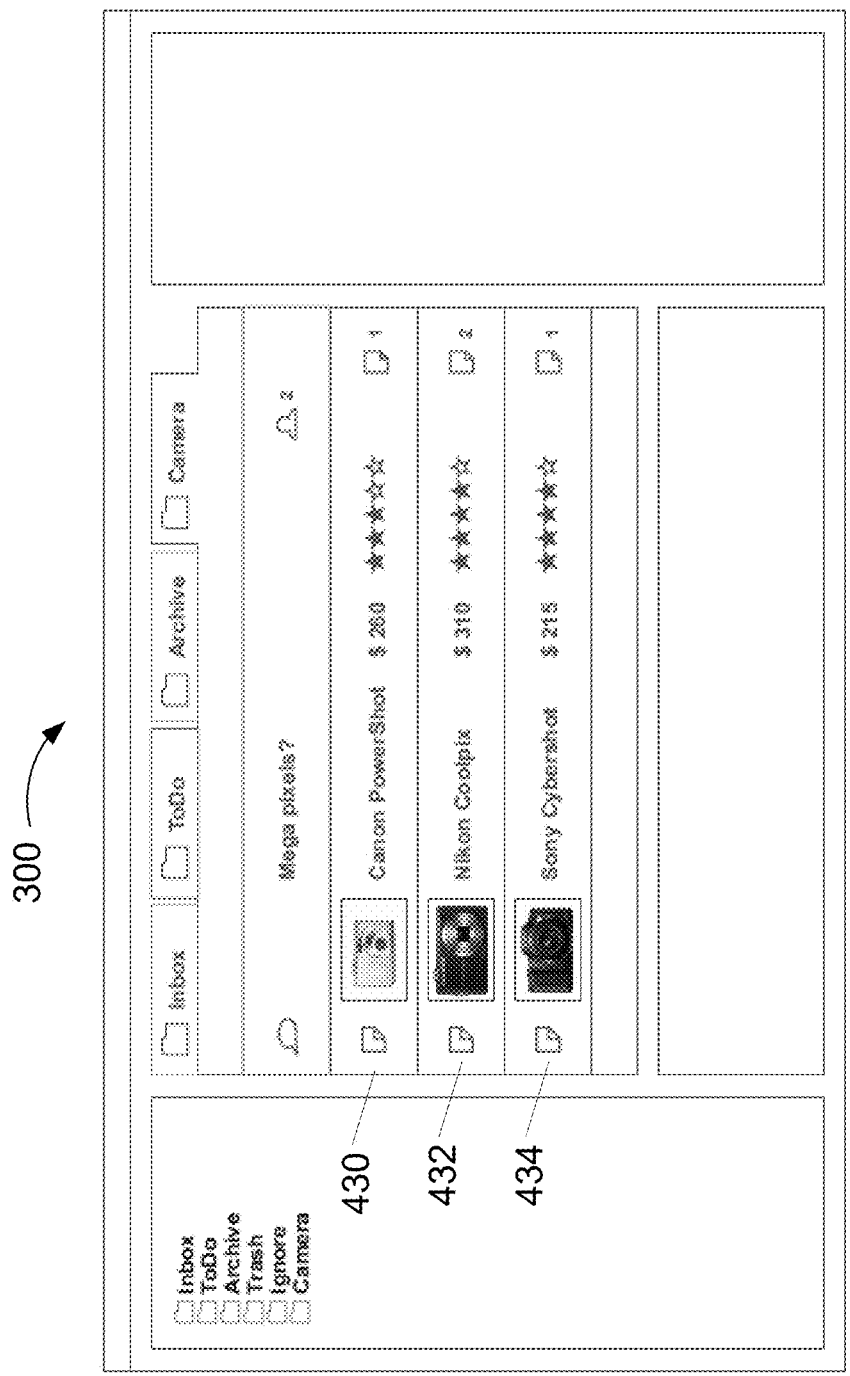
FIG. 3M is a more detailed diagram of the exemplary GUI Organization of FIG. 3J depicting the operation of managing files and URLs

FIG. 3L shows further details of how the GUI 300 used to manage files and URLs. In operation, the user drags and drops files and URLs onto containers to create new container items (IOs). Container items can be selected to view the content of a file or URL. In the example shown in FIG. 3L, containers are used for comparison shopping. Here URLs are dragged (indicated by arrows 422 and 424) to the Camera Container 426 to create IOs 420. The user can view the details of selected Container Items in the sub-panel 428. The user can then use a chat tool to discuss technical issues with experts. FIG. 3M continues the comparison shopping example of FIG. 3L and shows how images 430, 432 and 434 can be displayed in the Container list view. Note, that the row height is dynamically resized to accommodate the display of images 430, 432 and 434.

Figure 4A:
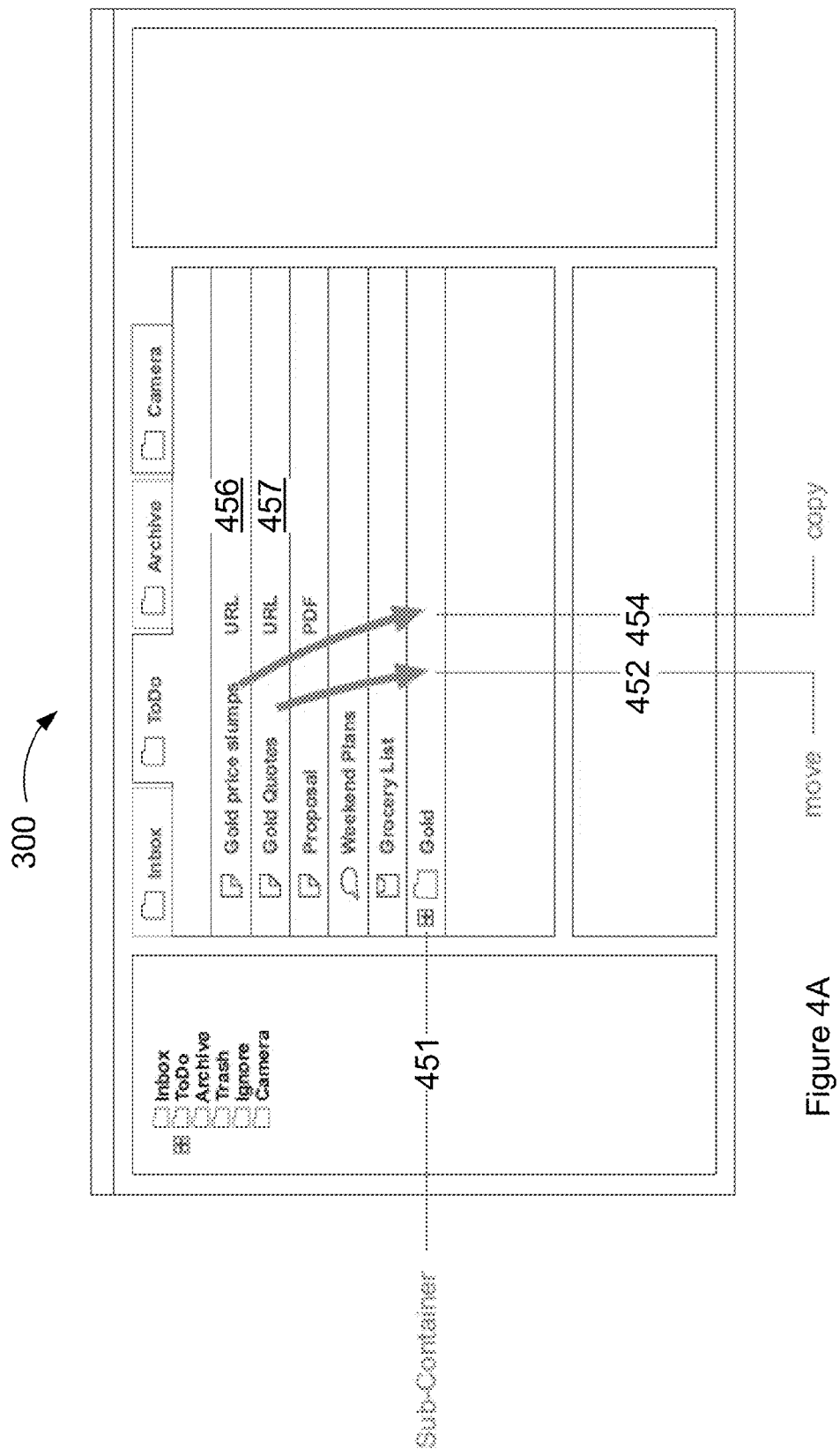
FIGS. 4A-4E are diagrams of an exemplary graphical user interface (GUI) operating within an electronic email application in accordance with one example embodiment disclosed herein depicting the operations of managing containers, sub-containers and IO replicas.
Figure 4B:
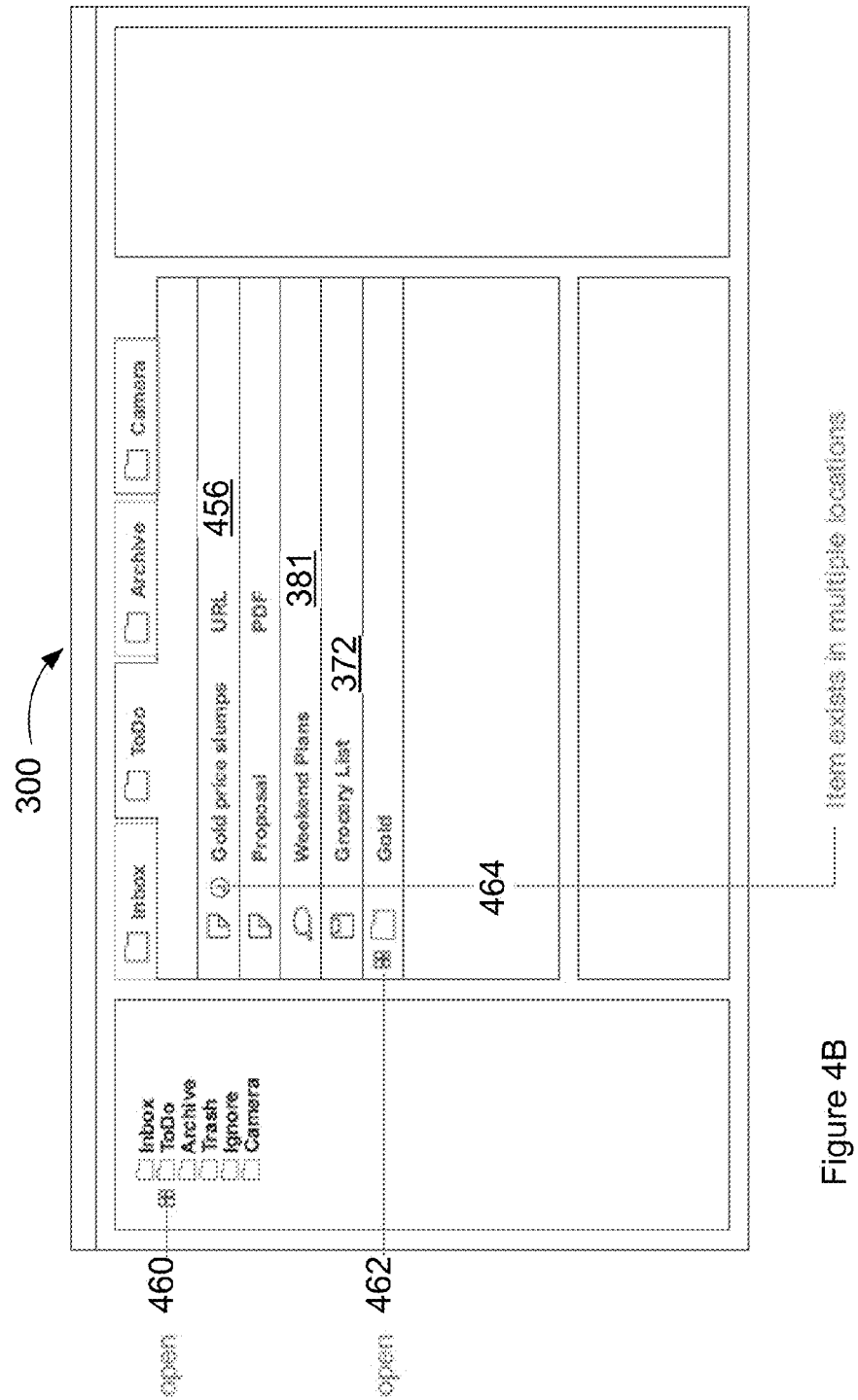
Figure 4C:
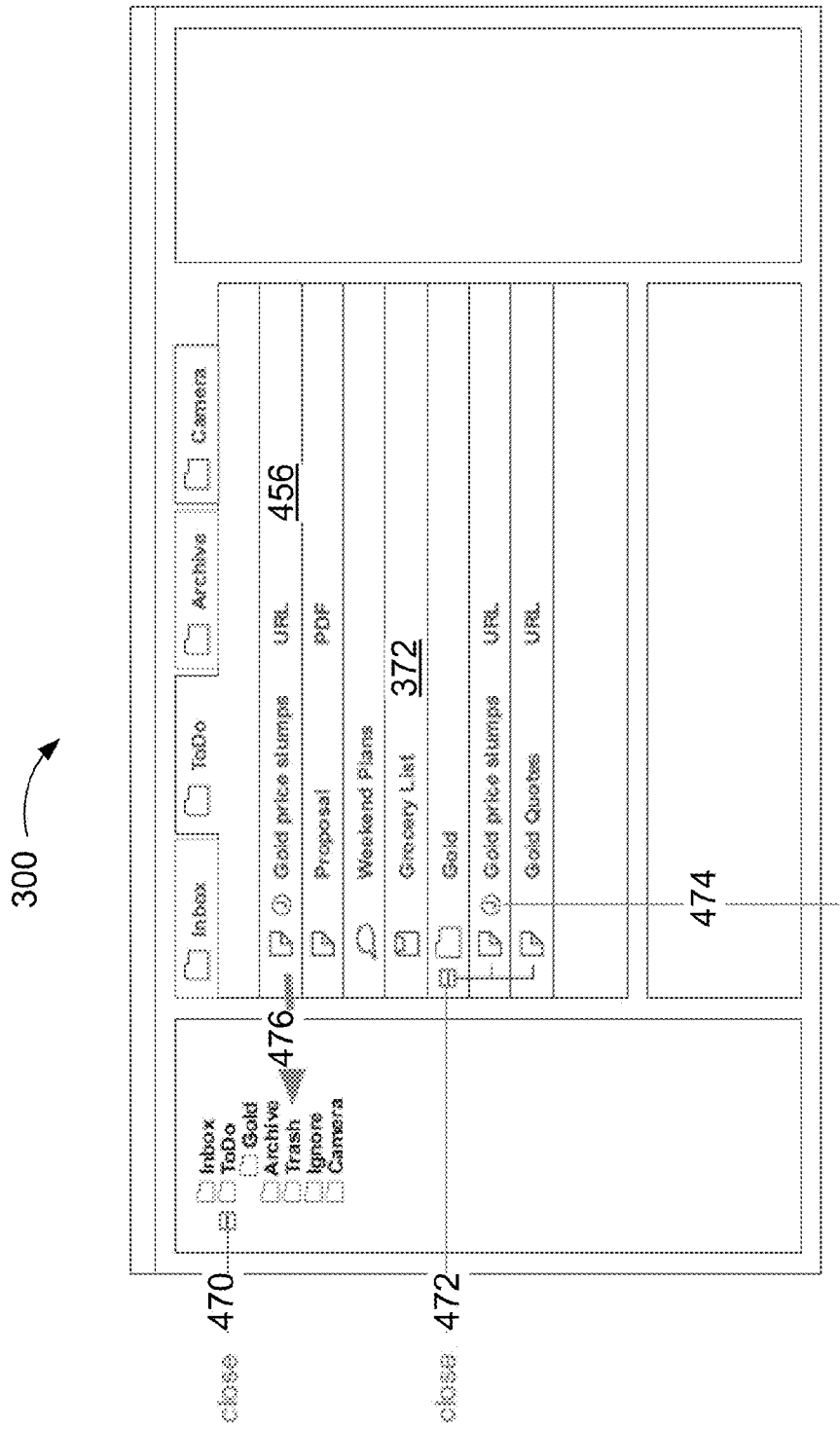

FIGS. 4A-4E are diagrams of the exemplary GUI 300 depicting the operations of managing containers. FIG. 4A shows the operation of moving (indicated by arrow 452 or copying indicated by arrow 454) objects 456 and 457, respectively, into a sub-container "Gold" 450 in container "To Do." FIG. 4B shows how the GUI 300 indicates that multiple copies exist. An IO is indicated that it is "Joined," using a (J) icon 464 to indicate that the item exists in multiple locations. The "Joined" indication is important because the user has a choice to copy and item or reference an item. If an item is subsequently modified, only the references will display the changes and a copy of the item will not.

Figure 4D:
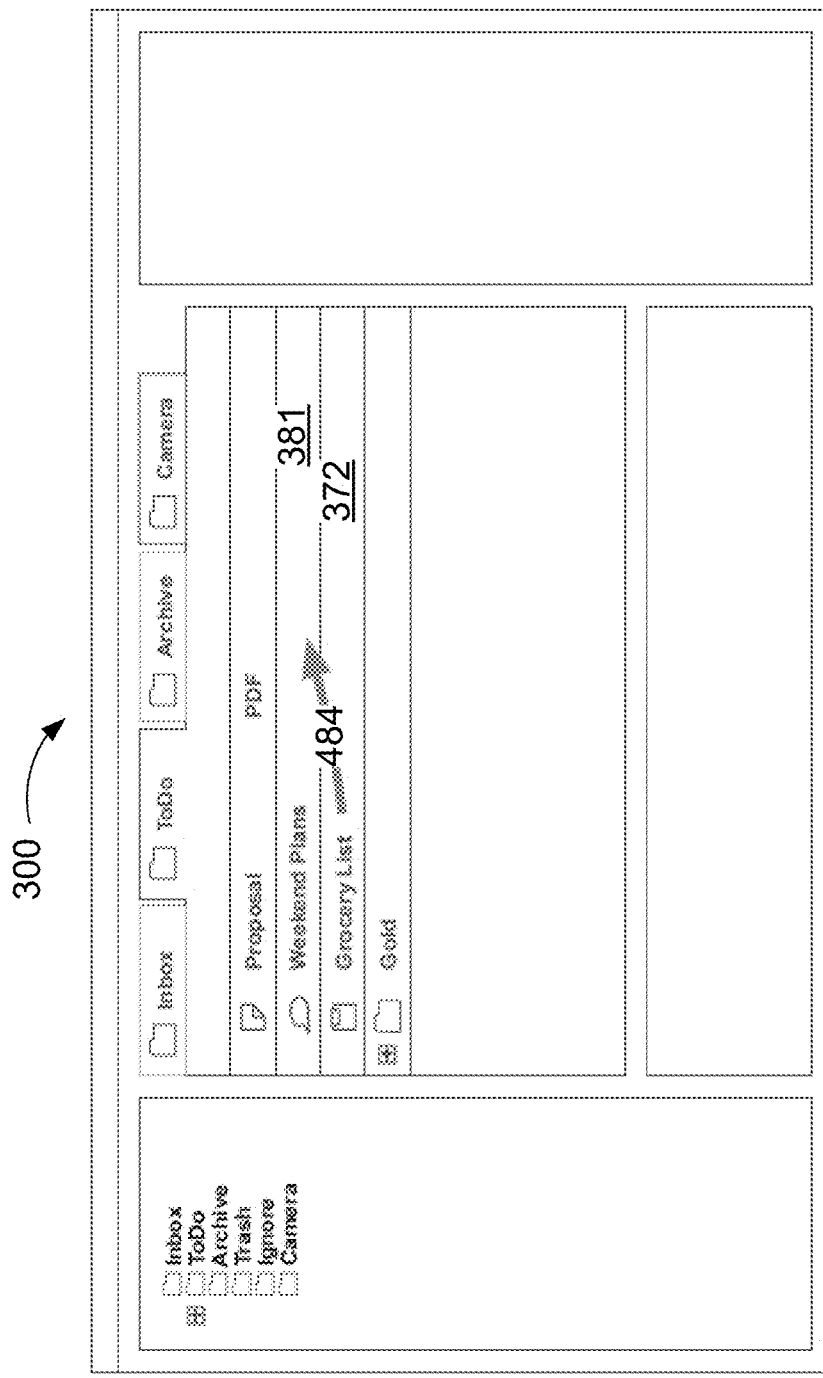
Figure 4E:

FIG. 4D shows the GUI 300 after the URL "Gold price slumps" 456 is deleted in one row and the sub-container "Gold" 450 is closed, and the object "Grocery List" 372 is moved by drag and drop operation indicated by arrow 484 to folder object "Weekend Plans" 381 and in the operation the user creates a sub-container (folder) including the task object "Grocery List" 372 inside the container "Weekend Plans" 381. FIG. 4E shows the result of moving task "Grocery List" 372 to "Weekend Plans" 381. In one embodiment, the user moves (drag-drop) container item "Grocery List" 372 onto container item "Weekend Plans" 381 there by making "Grocery List" 372 into a sub-container. Instead over moving a container item, the user can copy (shift-drag-drop) container items into a sub-container. The user can open folders by clicking the "+" symbol 441 and can close folders by clicking the "−" symbol 440. The user is also able to delete one or all instances of a container item or convert any container item into a sub-container by moving or copying container items onto other container items.

Figure 5:
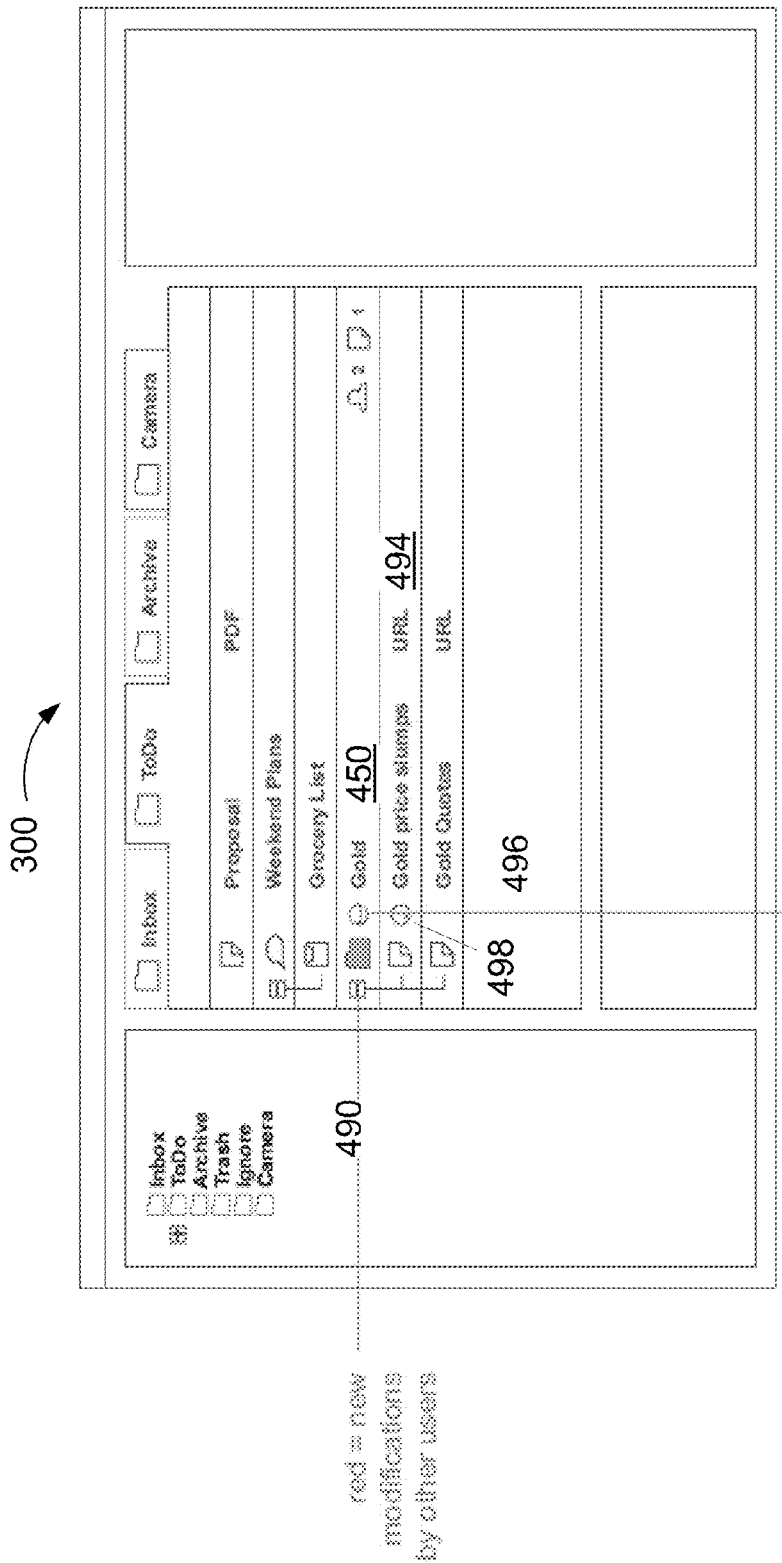
FIG. 5 is a diagram of an exemplary graphical user interface (GUI) operating within an electronic email application in accordance with one example embodiment disclosed herein depicting the operations of sharing sub-containers and IOs among participants.

FIG. 5 shows an example depicting the operations of sharing containers among participants. Using the GUI 300, the user can share any container item and associated resources (tools and data). In one embodiment, the user can share an object by dragging a participant icon onto the selected IO folder icon or dragging the selected IO folder icon onto a participant icon. The participant receives the IO as a copied IO, for example, the recipient(s) receive copies of the shared IOs in their Inbox(es) from where the IOs can be moved to other containers or folders. Finally, the IO copies are synchronized thus allowing for the use of collaborative features and sharing of files. These operations allow other users to view and modify shared containers. Here, icon 500 indicates that the object is shared with other users. Alternatively, icon 502 (a color or other variation of icon 500) indicates that not all users have yet accepted the invitation to share the object. Another alternative, icon 504 indicates modifications to an object. Icon 498 indicates that object "Gold price slumps" 494 exists in multiple locations. In addition to these indications of sharing, the GUI 300 allows the user to determine with whom the object is shared and view a count of the number of participants sharing the object.

Figure 6A:
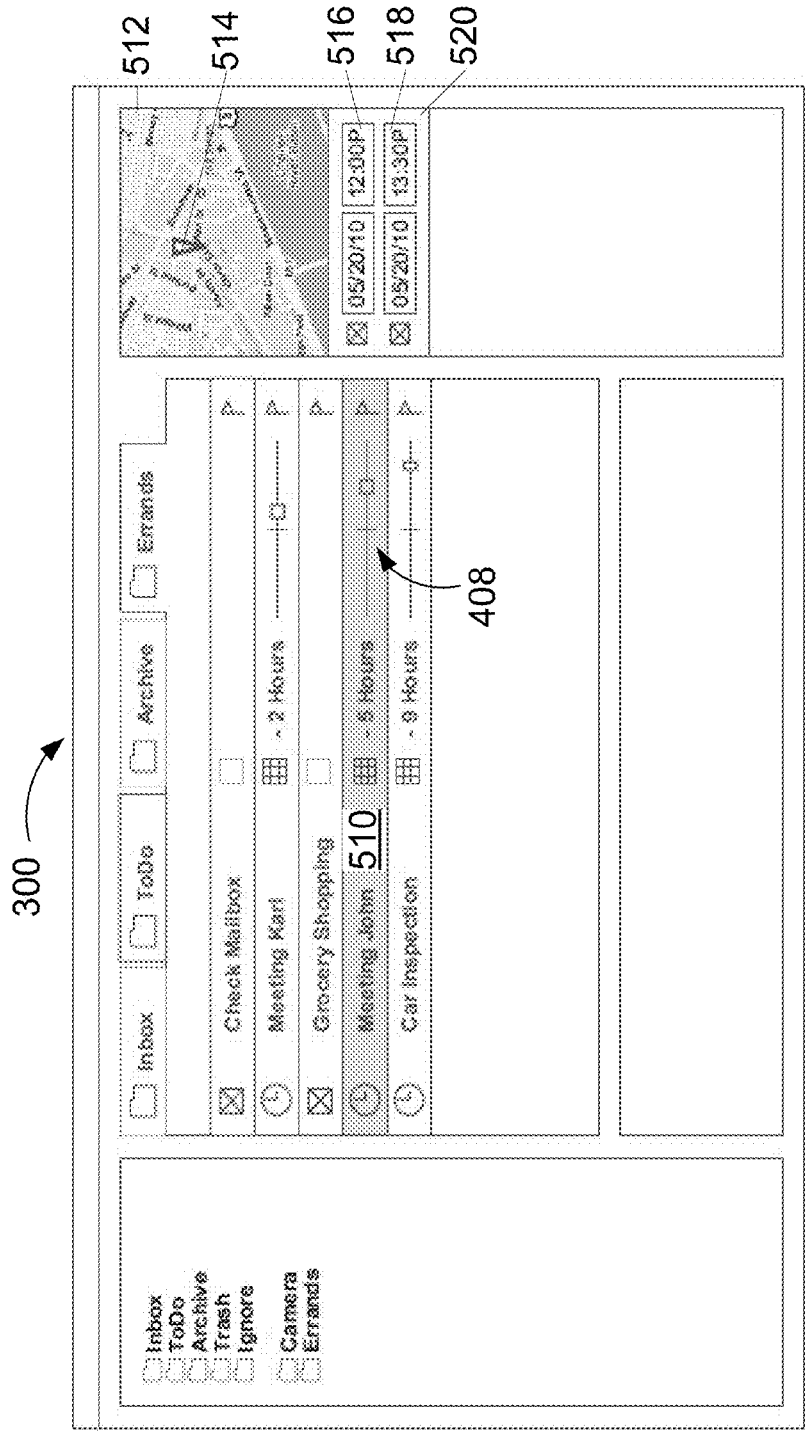
FIGS. 6A-6B are diagrams of an exemplary graphical user interface (GUI) operating within an electronic email application in accordance with one example embodiment disclosed herein depicting the operations of managing times and locations.
Figure 6B:
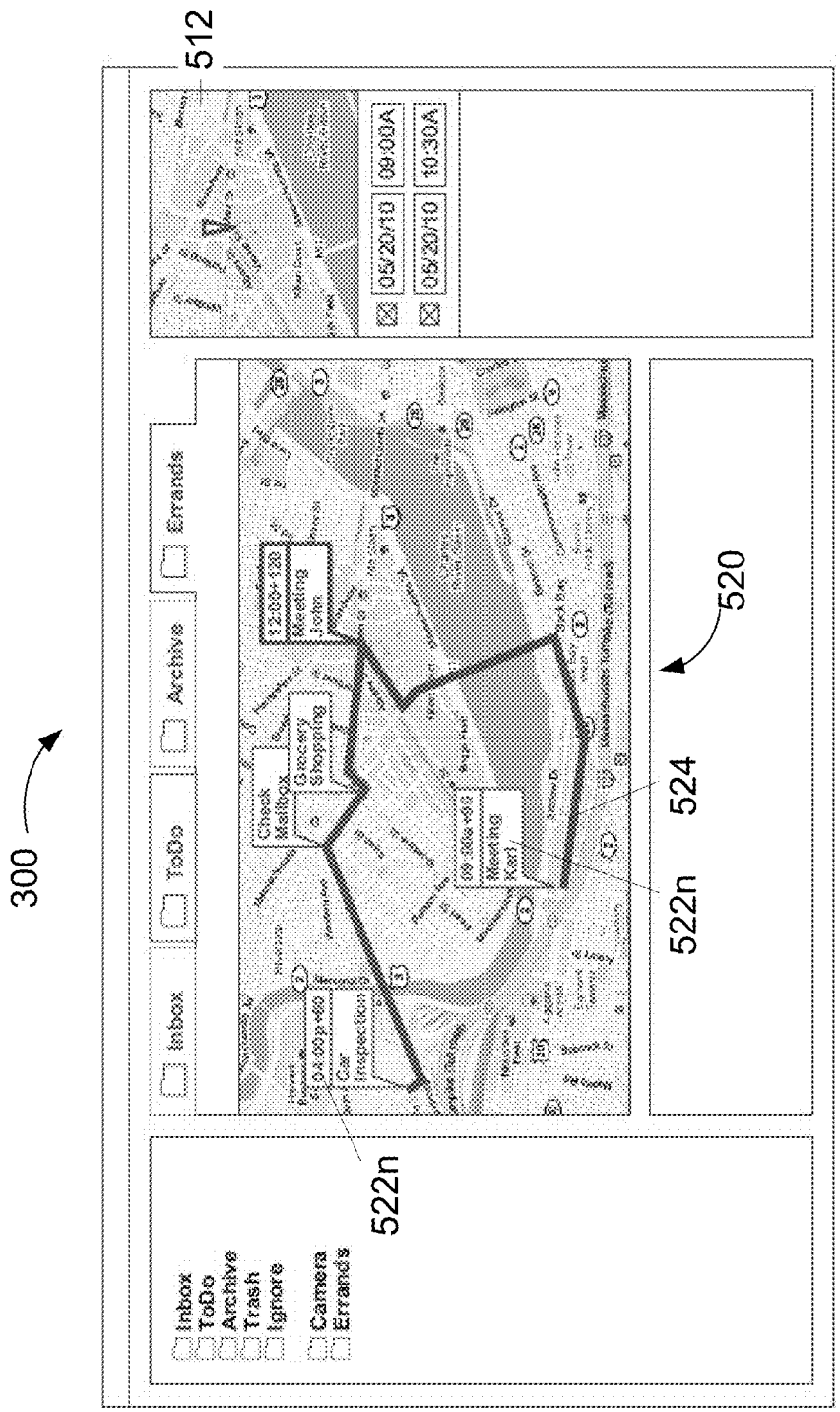

FIGS. 6A-6B show how the GUI 300 assists the user with the operations of managing times and locations. A container item can be associated with a time or a time frame and can also be associated with one or more geographic locations. Here event "Meeting John" 510 is associated with a start date and time 516 and an end date and time 518 displayed in sub-panel map view 520. Event "Meeting John" 510 is also associated with a geographical location 514 displayed in sub-panel (map) 512. FIG. 6B shows additional features of the GUI 300, for example, the map view 520 can display a calculated route 524 between container items 522a-522n. The container items can be viewed and modified on the time-line countdown 408 or on the map view 520.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method of managing information objects (IOs), in which at least one computer initiates execution of software instructions to perform the steps of:

providing a plurality of IOs;
  displaying the IOs as icons in a list view as one of a plurality of IO types;
receiving a selection of an IO;
associating the IO type of the selected IO with IO metadata;
displaying an indication of the IO metadata in an list view;
sharing the selected IO with at least one participant in response to one of:
a user dragging the at least one participant icon onto the selected IO icon; and
  a user dragging the selected IO icon onto the at least one participant icon;
copying the selected shared IO to the at least one participant;
synchronizing the copied selected shared IO; and
displaying an indication of sharing including
  providing a numeric count of participants associated with the selected shared IO.

2. The computer-implemented method as in claim 1, wherein the plurality of IO types comprise:
  a thread;
  a discussion;
  an instant message (IM);
  a short message (SMS);
  a blog;
  a forum;
  a text note;
  an event;
  a voice note (transcripts);
  a clipping;
  an RSS feed;
  a directory;
  a hyperlink;
  a bookmark;
  a rating annotation;
  an executable program; and
  wherein an icon is associated with the IO type to indicate a primary source of data.

3. The computer-implemented method as in claim 1, wherein the IO metadata includes detailed data of the IO and is at least one of:
  a date;
  a time;
  a deadline;
  a timeframe;
  a participant;
  a contributor;
  a hyperlink;
  an executable;
  a tag;
  a location;
  an address;
  a priority;
  a rating;
  a drawing;
  a note;
  a price;
  a quote; and
  a bid.

4. The computer-implemented method as in claim 1, wherein a second object of any type of IO can be displayed as subordinate to the selected IO represented as a folder in response to a user selection, moving the second object onto the selected IO allowing the user to visually arrange related objects.

5. The computer-implemented method as in claim 1 further comprising creating a reference to the selected IO by dragging an icon of one of following over the selected IO:
  a different IO;
  a task;
  a hyperlink; and
  a note from a separate application.

6. The computer-implemented method as in claim 1 further comprising associating user defined tags with the selected IO by associating the selected the IO with at least one tag.

7. The computer-implemented method as in claim 6 further comprising creating a tag list and hierarchically structuring the tag list by moving tags between tag folders.

8. The computer-implemented method as in claim 1 further comprising displaying dates and times associated with the selected IO by displaying one of:
  a numeric time countdown; and
  a visual countdown.

9. The computer-implemented method as in claim 1 further comprising:
  displaying a map view reflecting geographical locations corresponding to locations associated with the selected IO; and
  displaying a route on the map view between the IO and another different IO.

10. The computer-implemented method as in claim 1, wherein providing a numeric count of participants associated with the shared IO comprises providing a numeric count of participants sharing the shared IO.

11. In a personal information management (PIM) software system comprising:
  a processor;
  a processor memory;
  a storage medium for tangibly storing thereon program logic for execution by the processor, the program logic comprising:
  an information object (IO) display user interface, comprising:
    a first portion including one or more selectable tabs to select a container including a collection of IOs;
    a second portion including a list of IOs in a selected container arranged in a matrix with indications as a function of an IO type and associated metadata for each IO of:
      a participant associated with the IO;
      a relative time associated with the IO;
      a numeric count of documents associated with the IO;
      an indication of sharing including a numeric count of the participants associated with the IO;
    a third portion including a map view reflecting geographical locations corresponding to locations associated with a selected IO; and
    a participant list.

12. The IO display user interface of claim 11 further comprising an indication that an IO and corresponding second level IOs are shared by at least one participant.

13. The IO display user interface of claim 12, wherein the second portion of the interface indicates a count of participants sharing an IO and the third portion indicates names of the participants.

14. The IO display user interface of claim 13, wherein the second portion of the interface indicates whether all invited participants have accepted an invitation to share the IO and whether there is an update to the IO.

15. The IO display user interface of claim 11, wherein the third portion of the interface indicates one of:
  a numeric time countdown; and
  a visual countdown, of an IO selected by a user.

16. The IO display user interface of claim 11, wherein the second portion of the interface includes, on a row including an IO, an indication that at least one copy exists in multiple locations.

17. The IO display user interface of claim 11, wherein the second portion of the interface indicates a user defined tag associated with an IO and the third portion displays text related to the tag.

18. The IO display user interface of claim 11 wherein the second portion further includes indications for each IO of:
a numeric count of documents exchanged;
a numeric count of messages exchanged; and
a numeric count of unread and un-responded messages.

19. A computer-implemented method, in which at least one computer initiates execution of software instructions to perform the steps of: comprising:
coalescing information objects (IO)s from a plurality of sources for display in a user interface;
displaying views of IOs associated with icons representing user assigned folder types;
displaying IO metadata associated with selected ones of the IOs; and
providing user interface controls to move, copy subordinate the folders representing the IOs;
receiving a selection of a IO;
sharing the selected IO with at least one participant;
synchronizing the selected shared IO; and
displaying indications of sharing including a numeric count of the participants associated with the IO.

20. The computer-implemented method as in claim 19 further comprising providing a combined view of an information object and metadata in a personal information manager (PIM); and
wherein displaying indications of sharing further includes displaying an indication of which participants are sharing the IO.

21. A computer-implemented method of interacting with an information object (IO), in which at least one computer initiates execution of software instructions to perform steps of:
providing the IO;
sharing the IO among a plurality of participants by copying the IO to the plurality of participants;
synchronizing the copied shared IOs;
attaching metadata to the IO;
displaying an indication of the IO metadata in a list view;
displaying indications of sharing including a numeric count of the participants associated with the IO;
displaying a map view reflecting geographical locations corresponding to locations associated with a shared IO;
displaying a route on the map view between the IO and another different IO; and
in response to interaction with the list view by one of the participants, providing a communications path between at least two of the participants sharing the IO.

* * * * *